(12) United States Patent
Carvelli et al.

(10) Patent No.: US 10,909,005 B2
(45) Date of Patent: Feb. 2, 2021

(54) OBJECT-LEVEL METADATA-PRESERVING CROSS HETEROGENEOUS OPERATING SYSTEMS BACKUP AND RESTORE APPARATUSES, METHODS AND SYSTEMS

(71) Applicant: Datto, Inc., Norwalk, CT (US)

(72) Inventors: Giovanni Roberto Carvelli, Norwalk, CT (US); Chad A. Kosie, Norwalk, CT (US)

(73) Assignee: Datto, Inc., Norwalk, CT (US)

( * ) Notice: Subject to any disclaimer, the term of this patent is extended or adjusted under 35 U.S.C. 154(b) by 0 days.

(21) Appl. No.: 16/285,189

(22) Filed: Feb. 25, 2019

(65) Prior Publication Data

US 2020/0272544 A1 Aug. 27, 2020

(51) Int. Cl.
| | |
|---|---|
| G06F 11/14 | (2006.01) |
| G06F 9/4401 | (2018.01) |
| G06F 16/176 | (2019.01) |
| G06F 16/907 | (2019.01) |
| G06F 11/10 | (2006.01) |

(52) U.S. Cl.
CPC ........ *G06F 11/1471* (2013.01); *G06F 9/4411* (2013.01); *G06F 11/1004* (2013.01); *G06F 11/1451* (2013.01); *G06F 11/1458* (2013.01); *G06F 16/176* (2019.01); *G06F 16/907* (2019.01)

(58) Field of Classification Search
None
See application file for complete search history.

(56) References Cited

U.S. PATENT DOCUMENTS

| | | | |
|---|---|---|---|
| 6,785,786 B1 | 8/2004 | Gold | |
| 6,847,984 B1 | 1/2005 | Midgley | |
| 9,235,582 B1 | 1/2016 | Madiraju | |
| 9,569,443 B1* | 2/2017 | van Rietschote | G06F 16/116 |
| 9,690,666 B1 | 6/2017 | Shembavnekar | |
| 10,204,016 B1 | 2/2019 | Patwardhan | |
| 2005/0086443 A1 | 4/2005 | Mizuno | |
| 2010/0017444 A1* | 1/2010 | Chatterjee | G06F 16/10 |
| | | | 707/E17.007 |

(Continued)

*Primary Examiner* — Khoa A Doan
*Assistant Examiner* — Marwan Ayash
(74) *Attorney, Agent, or Firm* — Hanchukkheit LLP; Walter G. Hanchuk

(57) ABSTRACT

The Object-Level Metadata-Preserving Cross Heterogeneous Operating Systems Backup And Restore Apparatuses, Methods And Systems ("MPBR") transforms pairing request, backup request, restore request inputs via MPBR components into pairing response, backup response, restore response outputs. A device pairing request associated with a source share at a source device is obtained. A simulated block device backup volume for the source share is created on a backup device and formatted using a file system driver executable by the backup device's operating system. A backup request associated with the source share is obtained. A connection is established between the backup device and the source device using a file sharing protocol driver configured such that files metadata is presented to the backup device in a compatible metadata format. Files from the source share are synchronized. Changed synchronized files are determined. Metadata associated with the changed files is updated. A snapshot of the volume is generated.

21 Claims, 13 Drawing Sheets

(56) References Cited

U.S. PATENT DOCUMENTS

| | | |
|---|---|---|
| 2010/0100696 A1 | 4/2010 | Suzuki |
| 2011/0055536 A1* | 3/2011 | Banga .................. G06F 16/188 |
| | | 713/2 |
| 2011/0282841 A1 | 11/2011 | Saika |
| 2013/0226870 A1 | 8/2013 | Dash |
| 2016/0011790 A1 | 1/2016 | Rostoker |
| 2017/0091047 A1 | 3/2017 | Bangalore |
| 2017/0293628 A1 | 10/2017 | Adler |
| 2018/0091517 A1* | 3/2018 | Fury Christ .......... H04L 63/104 |
| 2018/0173596 A1 | 6/2018 | Petracca |
| 2018/0239555 A1 | 8/2018 | Cao |

* cited by examiner

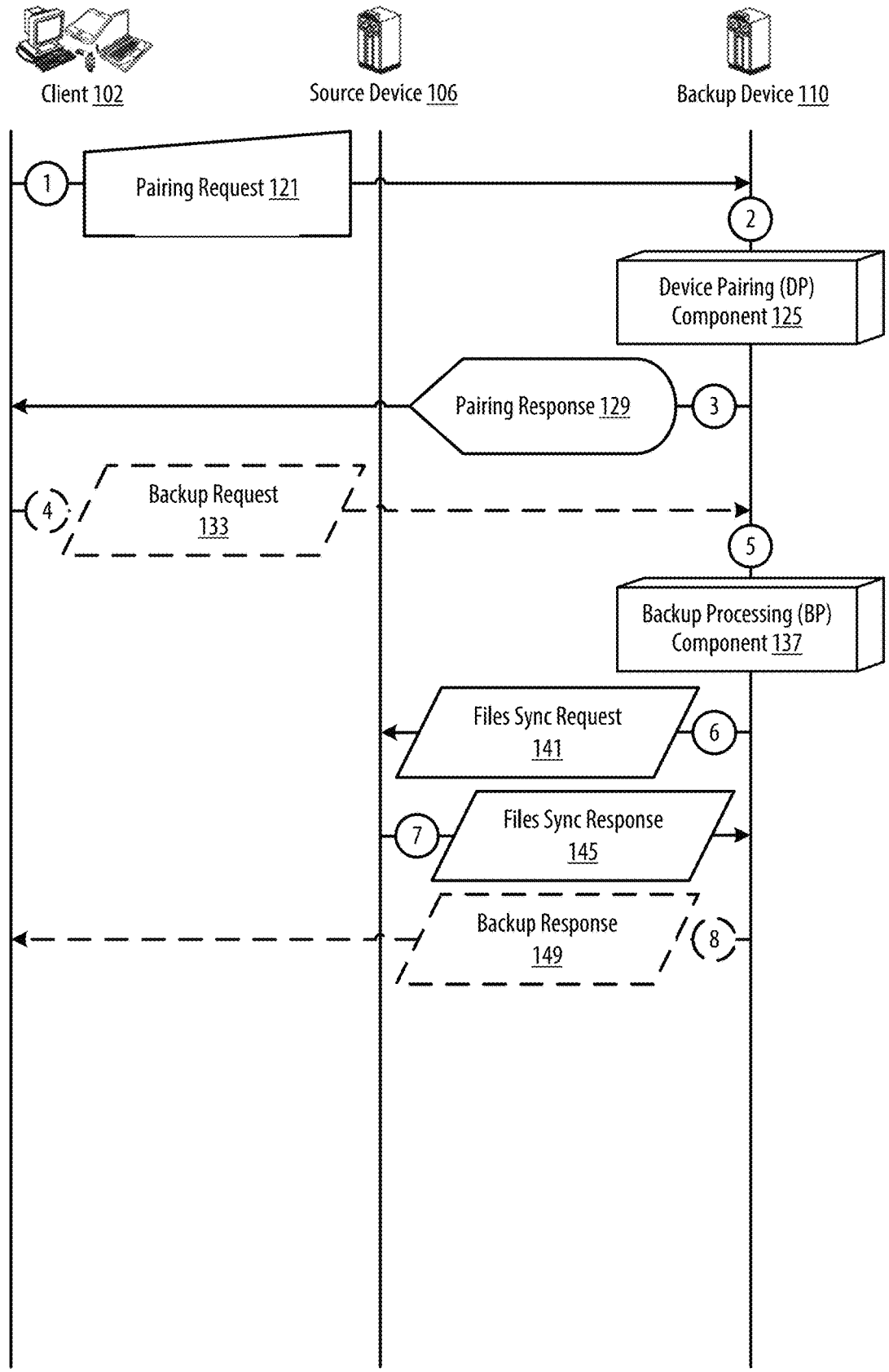
FIGURE 1: MPBR DATA FLOW

FIGURE 2: MPBR DP COMPONENT
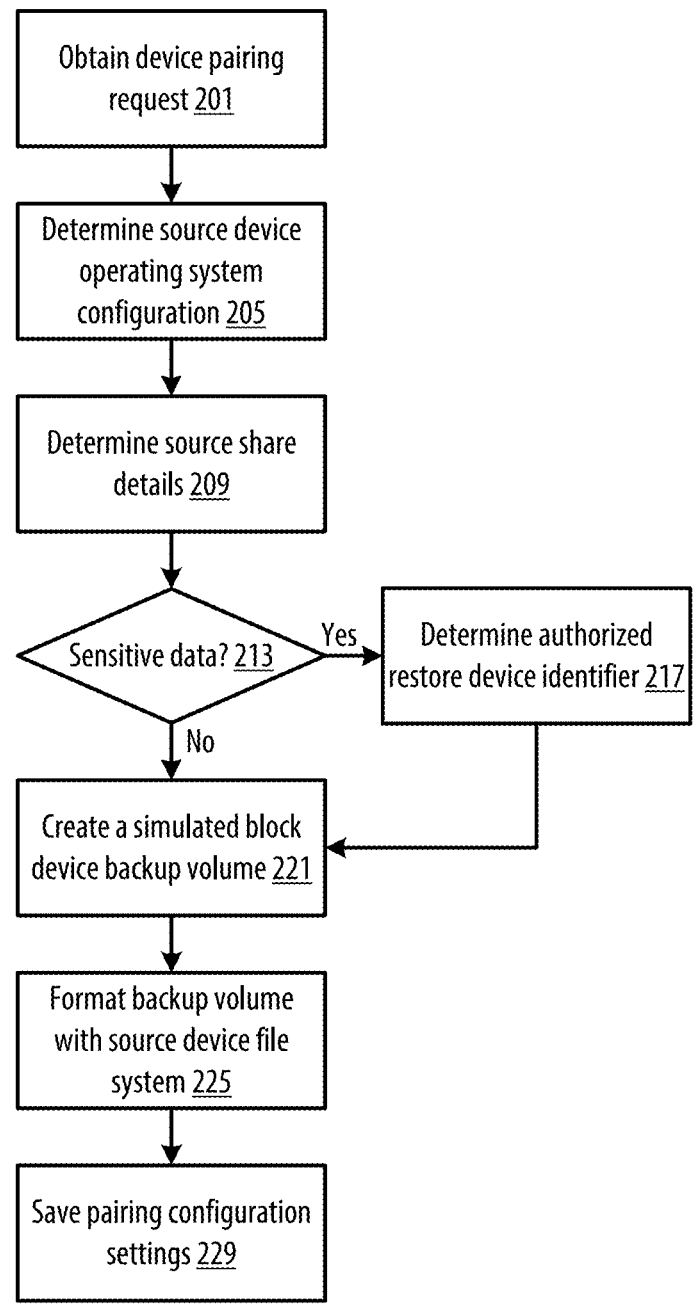

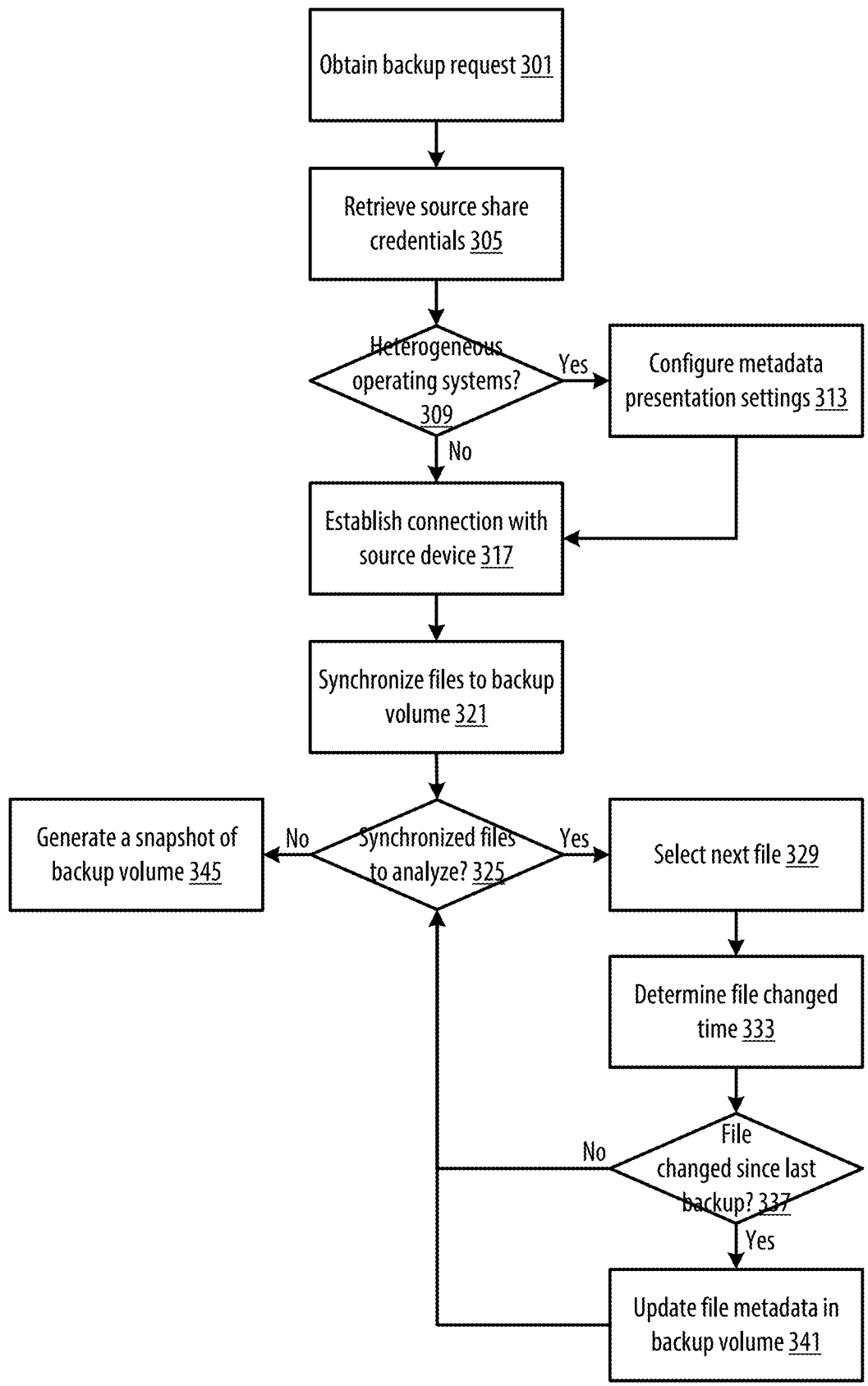
FIGURE 3: MPBR BP COMPONENT

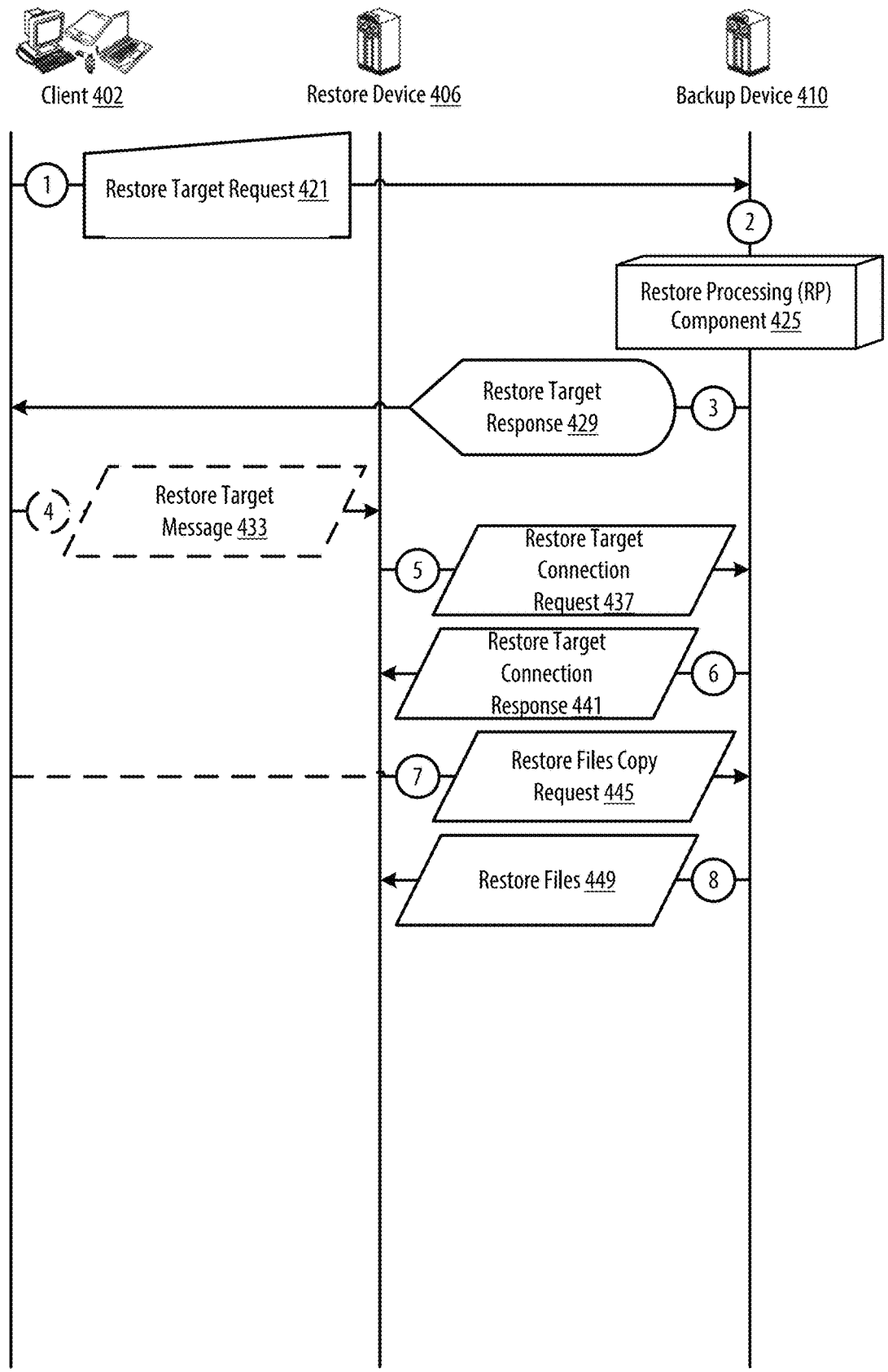
FIGURE 4: MPBR DATA FLOW

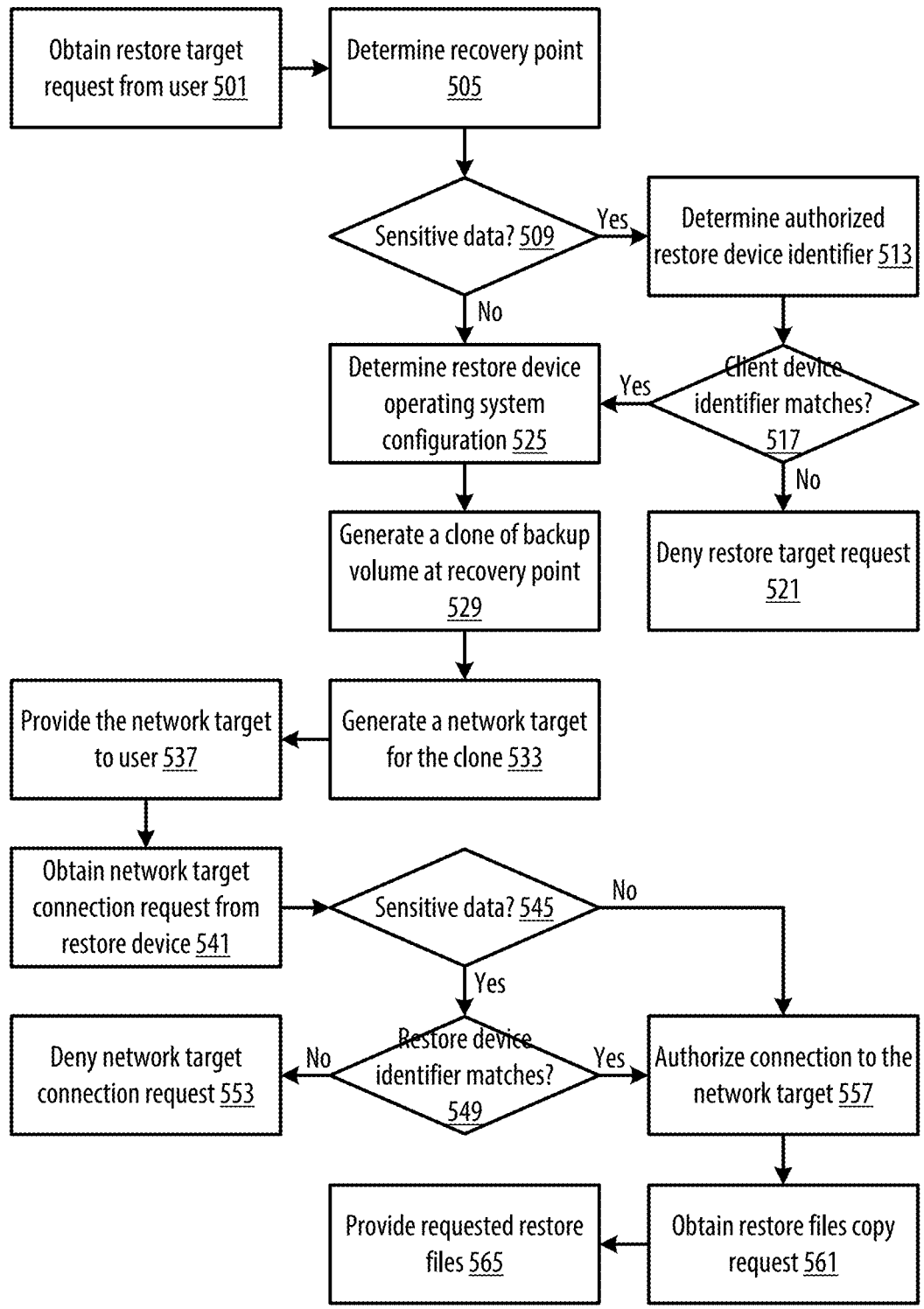

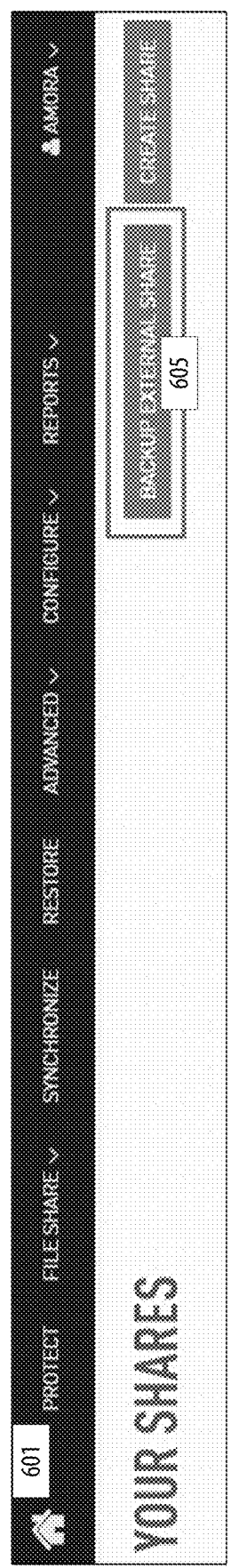
FIGURE 6: MPBR SCREENSHOT

FIGURE 7: MPBR SCREENSHOT

Protect a Share

701

Select System

Set Local Snapshot & Retention

Set Cloud Snapshot & Retention

Review & Confirm

Which system do you want to back up?

Identify a SMB Share to back up

Share Name  705
KnowledgeShare

SMB Address  710
\\\\KnowledgeShare

Retain NTFS File Permissions?  715
Yes

Credentials  720
☐ Connect as a Guest

Username
dadomain

Password
••••••••

Sensitive?  725
Yes

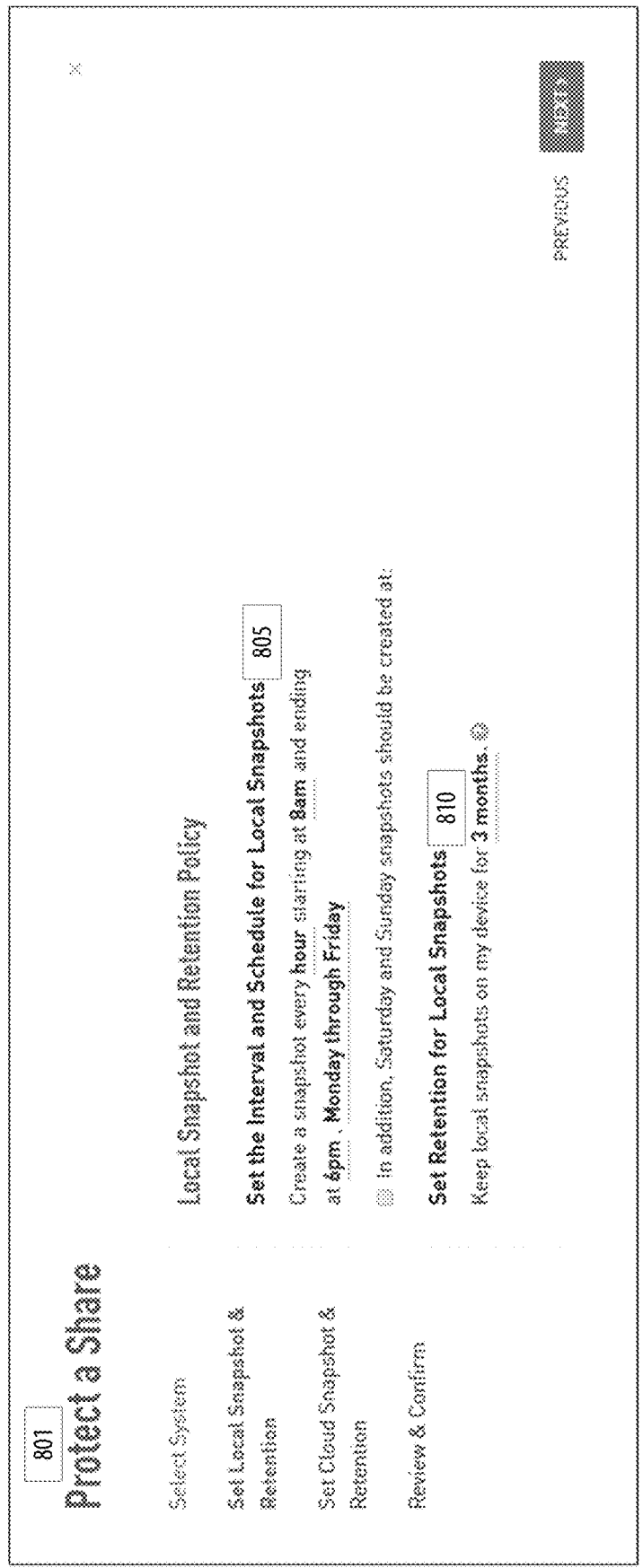
FIGURE 8: MPBR SCREENSHOT

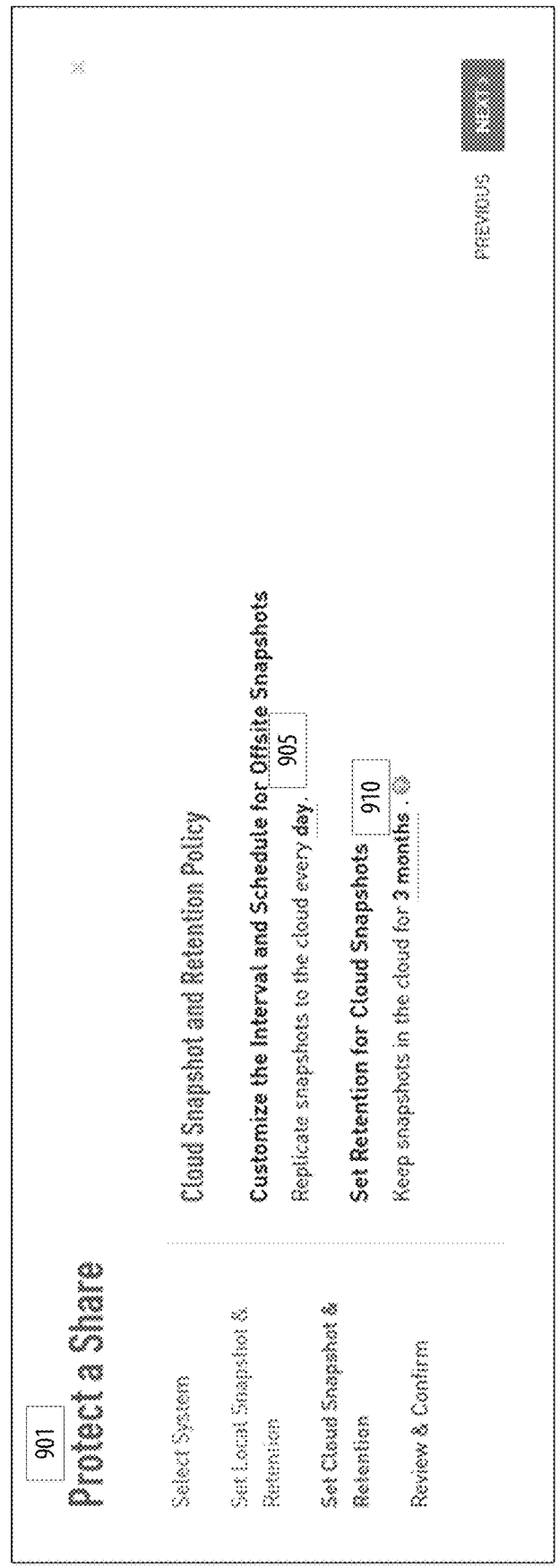
FIGURE 9: MPBR SCREENSHOT

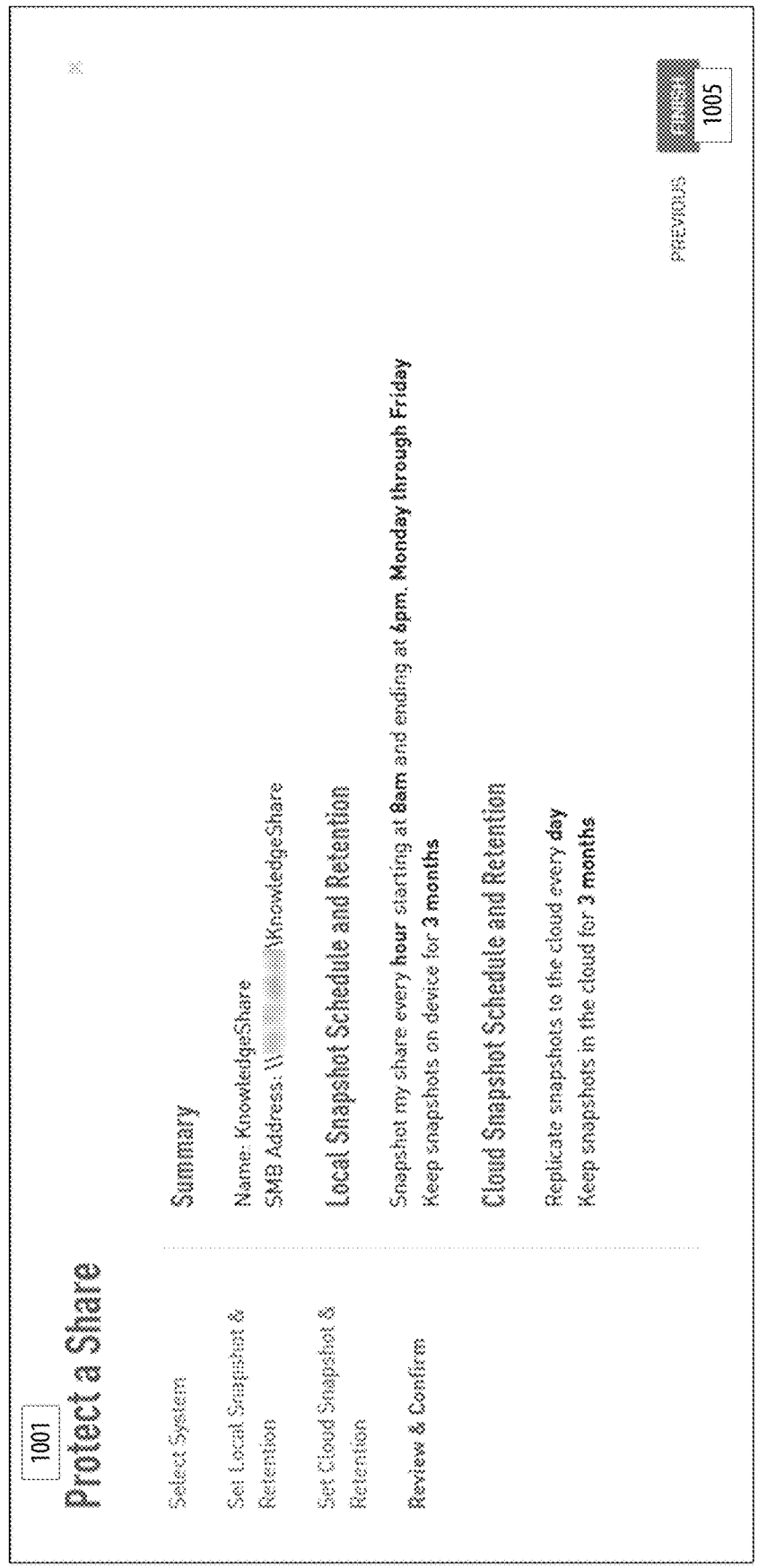
FIGURE 10: MPBR SCREENSHOT

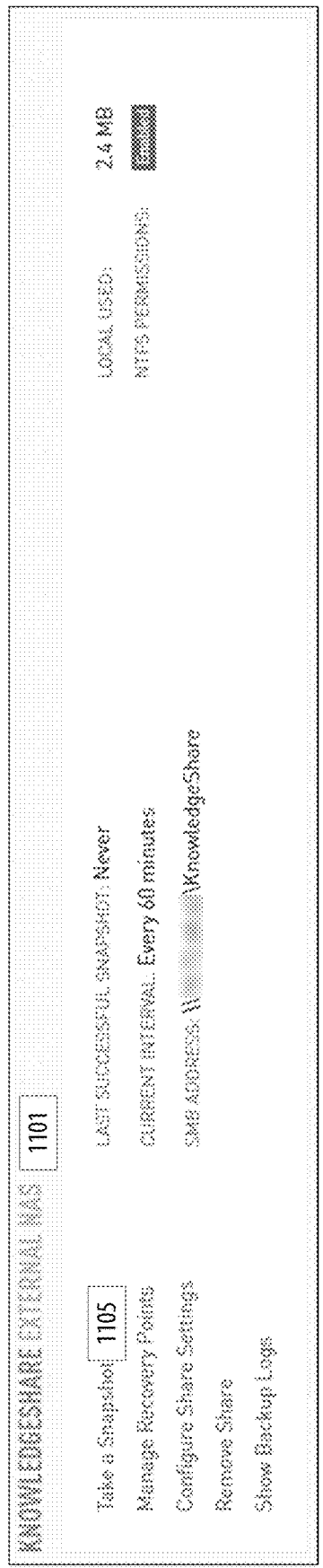
FIGURE 11: MPBR SCREENSHOT

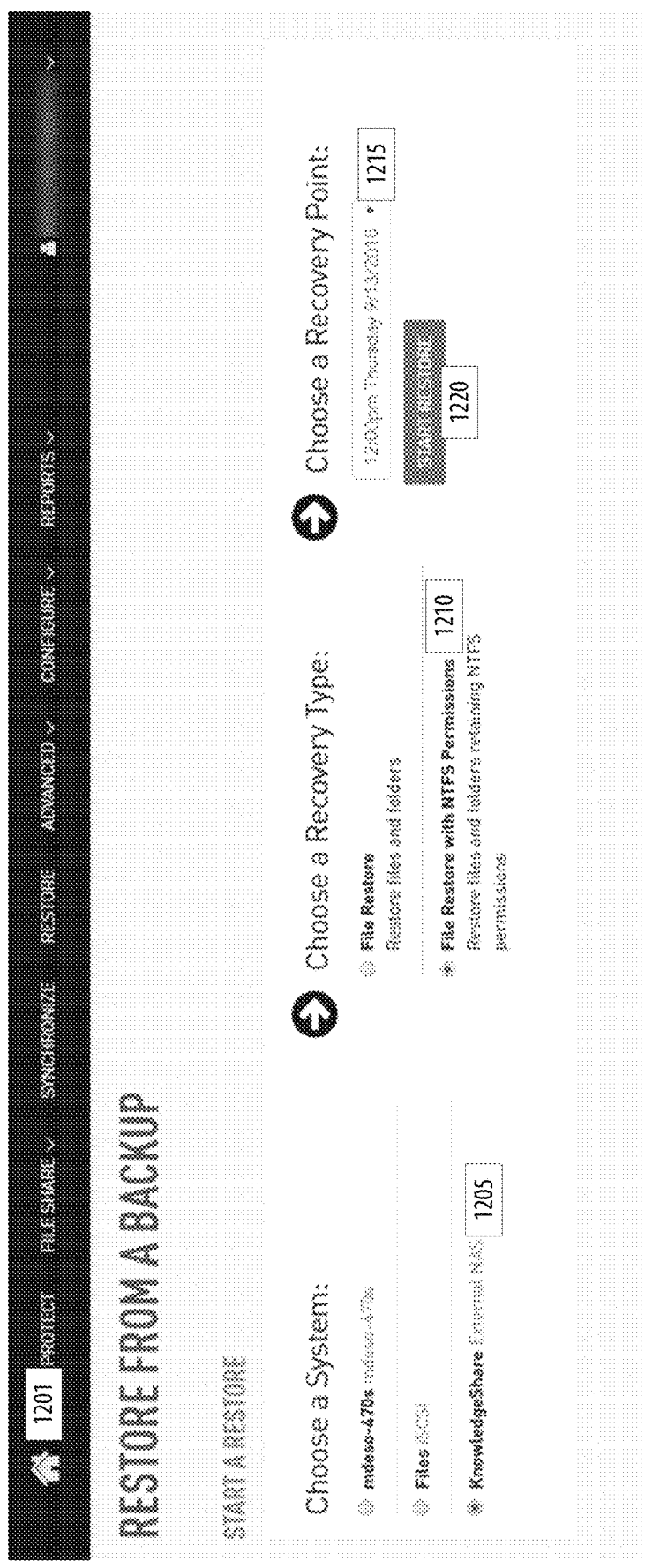
FIGURE 12: MPBR SCREENSHOT

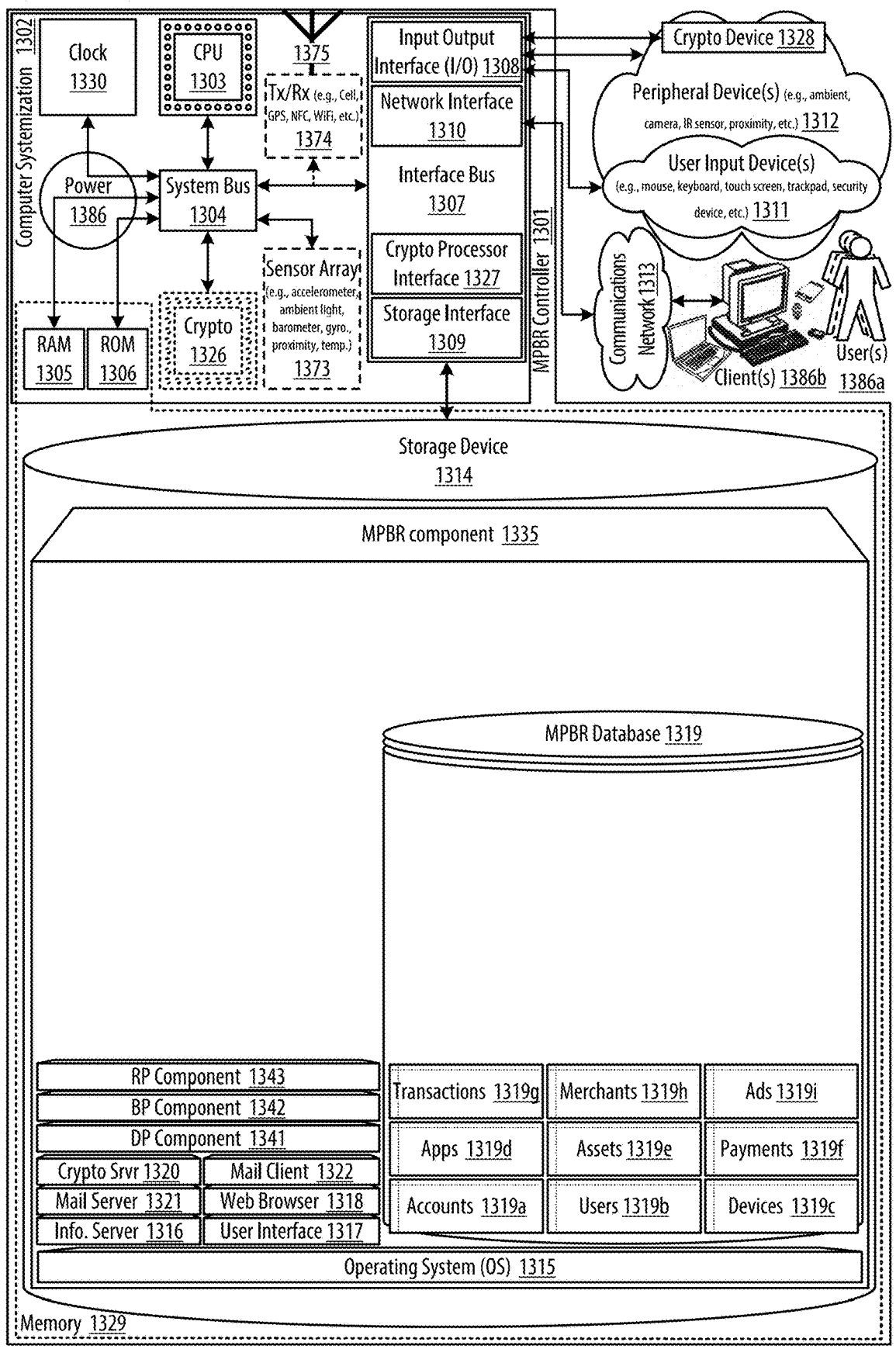
FIGURE 13: MPBR Controller

OBJECT-LEVEL METADATA-PRESERVING CROSS HETEROGENEOUS OPERATING SYSTEMS BACKUP AND RESTORE APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address backup and restore systems, and more particularly, include Object-Level Metadata-Preserving Cross Heterogeneous Operating Systems Backup And Restore Apparatuses, Methods And Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C.

BACKGROUND

Computer system backups are utilized to protect data from being lost due to equipment failures, malware and accidental deletions. A backup may involve copying files to be backed up from one location to another location. For example, files may be copied from a solid-state drive in a user's desktop to an external hard drive that may be connected to the user's desktop via USB.

BRIEF DESCRIPTION OF THE DRAWINGS

Appendices and/or drawings illustrating various, non-limiting, example, innovative aspects of the Object-Level Metadata-Preserving Cross Heterogeneous Operating Systems Backup And Restore Apparatuses, Methods And Systems (hereinafter "MPBR") disclosure, include:

FIG. 1 shows a datagraph illustrating data flow(s) for the MPBR;

FIG. 2 shows a logic flow illustrating embodiments of a device pairing (DP) component for the MPBR;

FIG. 3 shows a logic flow illustrating embodiments of a backup processing (BP) component for the MPBR;

FIG. 4 shows a datagraph illustrating data flow(s) for the MPBR;

FIG. 5 shows a logic flow illustrating embodiments of a restore processing (RP) component for the MPBR;

FIG. 6 shows a screenshot illustrating user interface(s) of the MPBR;

FIG. 7 shows a screenshot illustrating user interface(s) of the MPBR;

FIG. 8 shows a screenshot illustrating user interface(s) of the MPBR;

FIG. 9 shows a screenshot illustrating user interface(s) of the MPBR;

FIG. 10 shows a screenshot illustrating user interface(s) of the MPBR;

FIG. 11 shows a screenshot illustrating user interface(s) of the MPBR;

FIG. 12 shows a screenshot illustrating user interface(s) of the MPBR;

FIG. 13 shows a block diagram illustrating embodiments of a MPBR controller;

APPENDIX 1 ILLUSTRATES EMBODIMENTS OF THE MPBR

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Object-Level Metadata-Preserving Cross Heterogeneous Operating Systems Backup And Restore Apparatuses, Methods And Systems (hereinafter "MPBR") transforms pairing request, backup request, restore request inputs, via MPBR components (e.g., DP, BP, RP, etc. components), into pairing response, backup response, restore response outputs. The MPBR components, in various embodiments, implement advantageous features asset forth below.

INTRODUCTION

The MPBR provides unconventional features (e.g., backing up and restoring files and files metadata where the backup computing device has a different operating system than that of the source and/or restoration devices, restricting restoration of sensitive backed up files and files metadata to specified authorized devices) that were never before available in backup and restore systems. In one embodiment, the MPBR facilitates backing up and restoring files and files metadata (e.g., access control lists (ACLs)) where the backup computing device has a different operating system than that of the source and/or restoration devices. In one implementation, the MPBR may perform an incremental object level backup of a source computing device having Windows operating system using a backup device having Linux (e.g., Ubuntu) operating system, and may restore the objects to a restoration computing device having Windows operating system. Since metadata (e.g., ACL file permissions) models of different operating systems are different, metadata can be lost when performing an object-level backup of files and metadata passing through different operating systems. The MPBR implements an incremental object level backup and restore system that preserves metadata. Some of the advantages provided by the MPBR may include an agentless implementation (e.g., no specialized software has to run on the source and/or restoration devices), the use of incremental (e.g., if the file contents/ACLs of a file have not changed since the last time the file was backed up, the file does not have to be backed up again) object level (e.g., allowing restoration of individual files and/or folders)

backups, and quick restore speed (e.g., no extra file contents/ ACLs copying is entailed, just a network target pointer to the backup location). In another embodiment, the MPBR facilitates restricting restoration of sensitive backed up files and files metadata to specified authorized devices. In one implementation, a UUID, MAC address, and/or the like identifiers may be utilized to ensure that the restoration device is authorized to access sensitive backup data.

MPBR

FIG. 1 shows a datagraph illustrating data flow(s) for the MPBR. In FIG. 1, dashed lines indicate data flow elements that may be more likely to be optional. In FIG. 1, a client 102 (e.g., of a user) may send a pairing request 121 to a backup device 110 to facilitate pairing a source device 106 to the backup device. For example, the client may be a desktop, a laptop, a tablet, a smartphone, a smartwatch, and/or the like that is executing a client application. It is to be understood that, in some implementations, the client and the source device may be the same device. In one implementation, the pairing request may include data such as a request identifier, source device operating system configuration, backup settings (e.g., share name, file sharing protocol, share location, source share credentials, sensitive data flag, unique identifiers of authorized restore devices, backup schedule settings, backup data retention settings), and/or the like. In one embodiment, the client may provide the following example pairing request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version ="1.0" encoding ="UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MPBR.appqapp_name>
        <app_version>1.0 </app_version>
        <app_webkit_name>Mobile Safari</client_webkit_name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
```

-continued

```
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
  </client_details>
  <client_details>//Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <pairing_request>
    <request_identifier>ID_request_1</request_identifier>
    <source_OS>Windows 10</source_OS>
    <source_OS_file_system>NTFS</source_OS_file_system>
    <backup_settings>
      <share>
        <share_name>KnowledgeShare</share_name>
        <file_sharing_protocol>SMB</file_sharing_protocol>
        <share_location>\\SourceDevice\KnowledgeShare</share_location>
        <source_share_credentials>
          <username>dattomanqusername</username>
          <password>abc123</password>
        </source_share_credentials>
        <sensitive_flag>TRUE</sensitive_flag>
        <authorized_devices>source device UU/D</authorized_devices>
        <retain_NTFS_permissions>TRUE</retain_NTFS_permissions>
        <local_schedule>create a snapshot hourLy</local_schedule>
        <local_retention>retain snapshots 3 months</local_retention>
        <cloud_schedule>replicate snapshots daiLy</cloud_schedule>
        <cloud_retention>retain snapshots 3 months</cloud_retention>
      </share>
      <share>
        ...
      </share>
      ...
    </backup_settings>
  </pairing_request>
</auth_request>
```

A device pairing (DP) component 125 may utilize data provided in the pairing request to facilitate configuring pairing settings. See FIG. 2 for additional details regarding the DP component.

The backup device may send a pairing response 129 to the client to inform the user whether pairing settings were configured successfully and/or to request corrections. In one implementation, the pairing response may include data such as a response identifier, a status, and/or the like. In one embodiment, the backup device may provide the following example pairing response, substantially in the form of a HTTP(S) POST message including XML-formatted data, as provided below:

```
POST /pairing_response.php HTTP/1.1
Host: www.server.com
Content-Type: Application/XML
Content-Length: 667
<?XML version="1.0" encoding="UTF-8"?>
<pairing_response>
  <response_identifier>ID_response_1</response_identifier>
  <status>OK</status>
</pairing_response>
```

In some embodiments, the client may send a backup request 133 to the backup device to initiate a backup manually requested by the user. In one implementation, the backup request may include data such as a request identifier, a share name, and/or the like. In one embodiment, the client may provide the following example backup request, substantially in the form of a HTTP(S) POST message including XML-formatted data, as provided below:

```
POST /backup_request.php HTTP/1.1
Host: www.server.com
Content-Type: Application/XML
Content-Length: 667
<?XML version="1.0" encoding="UTF-8"?>
<backup_request>
  <request_identifier>ID_request_2</request_identifier>
  <share_name>KnowledgeShare</share_name>
</backup_request>
```

A backup processing (BP) component 137 may facilitate executing a backup of a share. In one embodiment, the backup may be initiated based on a schedule. In another embodiment, the backup may be initiated based on obtaining the backup request from the client. See FIG. 3 for additional details regarding the BP component.

The backup device may send a files sync request 141 to the source device to obtain changed (e.g., since the last time a backup was executed) files (e.g., including metadata) on the share that should be backed up on a backup volume. The source device may send a files sync response 145 to the backup device with the requested changed files.

In some embodiments, the backup device may send a backup response 149 to the client to inform the user whether the backup was completed successfully. In one implementation, the backup response may include data such as a response identifier, a status, and/or the like. In one embodiment, the backup device may provide the following example backup response, substantially in the form of a HTTP(S) POST message including XML-formatted data, as provided below:

POST /backup_response.php HTTP/1.1
Host: www.server.com
Content-Type: Application/XML
Content-Length: 667
<?XML version="1.0" encoding="UTF-8"?>
<backup_response>
<response_identifier>ID_response_2</response_identifier>
<status>OK</status>
</backup_response>

FIG. 2 shows a logic flow illustrating embodiments of a device pairing (DP) component for the MPBR. In FIG. 2, a device pairing request may be obtained at 201. For example, the device pairing request may be obtained as a result of a user pairing a source device to a backup device.

Operating system configuration of the source device (e.g., associated with a network share) may be determined at 205. For example, the operating system configuration may include information such as an identifier of the operating system (e.g., Windows 10), an identifier of the file system (e.g., NTFS), and/or the like that determines the configuration of files metadata to be backed up. In one implementation, the device pairing request may be parsed (e.g., using PHP commands) to determine the operating system configuration (e.g., based on the values of the source_OS and/or source_OS_file_system fields). It is to be understood that, in some implementations, operating system configuration information may be specified for the network share, and different network shares of the source device may have different operating system configurations. In some embodiments, a restore device (e.g., one or more restore devices) that is different from the source device may be specified by the user. Accordingly, operating system configuration of the restore device(s) may also be determined.

Source share details may be determined at 209. For example, the source share details may include information such as an identifier of the network share (e.g., a share name), a specification of a network file sharing protocol associated with the network share, share location, source share credentials (e.g., username and password), and/or the like that allows the backup device to connect to the network share of the source device. In one implementation, the device pairing request may be parsed (e.g., using PHP commands) to determine the source share details (e.g., based on the values of the share_name, file_sharing_protocol, share_location, source_share_credentials, and/or the like fields). For example, the source share details may be tested to verify connectivity to the network share as follows:
test share connectivity
'mount' '-t' 'cifs' '-o'
'credentials=/path1/path2/1ABCDE,nodev,noexec,nosuid,sec=ntlmv2,vers=2.1,ro,cifsacl'
'//host-name/cifs' 'host1/mounts/isMountableTest-A12345-extnas'

A determination may be made at 213 whether sensitive data restricted to being restored to specified restore devices is stored on the source device. In one implementation, the device pairing request may be parsed (e.g., using PHP commands) to determine whether sensitive data is stored on the source device (e.g., based on the value of the sensitive_flag field).

If sensitive data is stored on the source device, authorized restore device identifier(s) of authorized restore device(s) may be determined at 217. In one implementation, the device pairing request may be parsed (e.g., using PHP commands) to determine the authorized restore device identifier(s) (e.g., based on the value of the authorized_devices field). For example, an authorized restore device identifier may be a universally unique identifier (UUID), a MAC address, and/or the like.

A simulated block device backup volume for the network share may be created on the backup device at 221. In one embodiment, the simulated block device backup volume may be utilized to store backup copies of files and their respective metadata from the network share. In one implementation, the backup device may utilize Linux (e.g., Ubuntu) operating system, and may create a ZFS zvol (e.g., a simulated block device snap shotable via ZFS) for the network share. For example, a ZFS zvol may be created as follows:
create zvol
'zfs' 'create' '-s' '-V' '16T' '-b' '128k'
'path10/path11/a1234b2e05f24d23ac4c1eed7f123ab4'

The simulated block device backup volume may be formatted with the source device file system at 225. In one implementation, the simulated block device backup volume may be formatted with the NTFS filesystem using NTFS-3G driver. For example, the ZFS zvol may be formatted as follows:
format zvol with ntfs
'parted' '-s' '-a' 'optimal'
'/path1/zvol/path10/path11/a1234b2e05f24d23ac4c1eed7f123ab4' 'mklabel' 'gpt' '--'
'mkpart' 'primary' 'ntfs' '1' '-1'
'mkntfs' '-f' '/path1/zvol/path10/path11/a1234b2e05f24d23ac4c1eed7f123ab4-part1'

Pairing configuration settings may be saved at 229. For example, the pairing configuration settings may include information regarding the source device, information regarding the restore device(s), information regarding the simulated block device backup volume, backup scheduling and/or retention information (e.g., determined based on parsing the device pairing request), and/or the like. In one implementation, the pairing configuration settings may be saved in a configuration file. In another implementation, the pairing configuration settings may be saved in a database (e.g., via MySQL database commands).

FIG. 3 shows a logic flow illustrating embodiments of a backup processing (BP) component for the MPBR. In FIG. 3, a backup request associated with a source device may be obtained by a backup device at 301. For example, the backup request may be obtained as a result of a user initiating a backup manually for a network share of the source device. In another example, the backup request may be obtained as a result of the MPBR initiating a scheduled backup (e.g., based on a backup schedule specified by the user) for a network share of the source device.

Source share credentials may be retrieved at 305. For example, the source share credentials may allow the backup device to connect to the network share of the source device. In one implementation, pairing configuration settings associated with the source device may be retrieved (e.g., from a configuration file, from a database) to determine the source share credentials.

A determination may be made at 309 whether the source device and the backup device utilize heterogeneous operating systems. In one implementation, pairing configuration settings associated with the source device may be retrieved (e.g., from a configuration file, from a database) to determine whether the source device operating system (e.g., Windows) is different (e.g., with regard to metadata formatting) from the backup device operating system (e.g., Linux).

If it is determined that the source device and the backup device utilize heterogeneous operating systems, metadata presentation settings may be configured at 313. In one implementation, a driver (e.g., Linux's CIFS driver) that allows file system access over a network may be configured such that the metadata (e.g., ACLs) of the source device file system (e.g., NTFS) of the source share is presented to the backup device in a compatible format (e.g., Linux Extended Attribute).

A connection between the backup device and the source device may be established at 317. In one implementation, the backup device may connect to the share location (e.g., \\SourceDevice\KnowledgeShare) of the network share using the network file sharing protocol (e.g., SMB) associated with the network share and the source share credentials. The connection may be established using the driver (e.g., Linux's CIFS driver) configured to present metadata to the backup device in a compatible format (e.g., Linux Extended Attribute) in accordance with the metadata presentation settings. For example, the connection may be established using Linux's CIFS driver with the 'cifsacl' option, which configures the driver to present Windows ACLs in a Linux extended file attribute format, as follows:

connecting to the share over cifs
    'mount' '-t' 'cifs' '-o'
    'credentials=/path1/path2/ABCDE1,nodev,noexec, nosuid,sec=ntlm,vers=1.0,ro,cifsacl'
    '//host-name/cifs'     '/host1/mounts/ a1234b2e05f24d23ac4c1eed7f123ab4-extnas'

Files to be backed up may be synchronized to the simulated block device backup volume for the network share at 321. In one implementation, the entire contents of the network share may be copied. In another implementation, an incremental operation that copies files that have been changed since the previous backup may be performed. For example, Linux's Rsync utility may be utilized to synchronize files as follows:

rsync
    'rsync' '--stats' '--inplace' '-rltD' '--delete' '--exclude'
      'lost+found'     '--info=progress2'     'host1/mounts/ a1234b2e05f24d23ac4c1eed7f123ab4-extnas/'
    '/host1/mounts/cifs'

A determination may be made at 325 whether there remain synchronized files to analyze. In one implementation, each of the files to be backed up may be analyzed. If there remain files to analyze, the next file may be selected for analysis at 329.

The selected file's changed time may be determined at 333. In one implementation, the selected file's attributes may be analyzed to determine the changed time. In another alternative implementation, instead of determining the changed time, a checksum of the selected file may be determined. A determination may be made at 337 whether the selected file was changed since the last backup. In one implementation, the selected file's changed time may be compared against the start time of the last backup to make this determination. In another alternative implementation, the selected file's checksum may be compared against the checksum of the selected file in the simulated block device backup volume.

If it is determined that the selected file's changed time is more recent than the start time of the last backup, the selected file's metadata (e.g., ACLs) in the simulated block device backup volume may be updated at 341. In one implementation, metadata of the selected file on the network share provided by the driver (e.g., Linux's CIFS driver) may be copied to metadata of the selected file on the simulated block device backup volume using NTFS-3G driver. For example, as Linux's CIFS driver presents ACLs as a binary blob in a Linux Extended Attribute format, and as NTFS-3G also presents ACLs as a binary blob, the formats of the two binary blobs are similar enough that the string may be copied from Linux's CIFS driver and written to the NTFS-3G driver as follows:

getting and setting xattr may be done with bindings or reproduced with the commands:
    getfattr -n system.cifs_acl <file on cifs share>
    setfattr -v "base64 from last command" -n system.ntfs_acl <file on ntfs volume>

In another implementation, metadata of the selected file on the network share may be decoded and then corresponding values may be set in metadata of the selected file on the simulated block device backup volume.

If there are no more synchronized files to analyze, a snapshot of the simulated block device backup volume may be generated at 345. In one implementation, a ZFS snapshot of the zvol may be performed. For example, a snapshot may be utilized as a recovery point during a restore operation.

FIG. 4 shows a datagraph illustrating data flow(s) for the MPBR. In FIG. 4, a client 402 (e.g., of a user) may send a restore target request 421 to a backup device 410 to facilitate restoring files to a restore device 406 (e.g., the restore device may be the same as the source device associated with a backed up network share or a different device). For example, the client may be a desktop, a laptop, a tablet, a smartphone, a smartwatch, and/or the like that is executing a client application. It is to be understood that, in some implementations, the client and the restore device may be the same device. In one implementation, the restore target request may include data such as a request identifier, restore device operating system configuration, restore settings (e.g., a share name, a snapshot identifier), a client device unique identifier, and/or the like. In one embodiment, the client may provide the following example restore target request, substantially in the form of a HTTP(S) POST message including XML-formatted data, as provided below:

POST /restore_target_request.php HTTP/1.1
    Host: www.server.com
    Content-Type: Application/XML
    Content-Length: 667
    <?XML version="1.0" encoding="UTF-8"?>
    <restore_target_request>
    <request_identifier>ID_request_11</request_identifier>
    <restore_OS>Windows 10</restore_OS>
    <restore_OS_file_system>NTFS</restore_OS_file_system>
    <restore_settings>
      <share_name>KnowledgeShare</share_name>
      <snapshot_identifier>name or timestamp of snapshot</snapshot_identifier>
      <restore_NTFS_permissions>TRUE</restore_NTFS_permissions>
    </restore_settings>

<device_identifier>cLient device UUID</device_identifier>
</restore_target_request>

A restore processing (RP) component 425 may utilize data provided in the restore target request to facilitate executing a restore operation of files backed up from the network share to the restore device. See FIG. 5 for additional details regarding the RP component.

The backup device may send a restore target response 429 to the client to provide the user with a restore target. In one implementation, the restore target response may include data such as a response identifier, a restore target, and/or the like. In one embodiment, the backup device may provide the following example restore target response, substantially in the form of a HTTP(S) POST message including XML-formatted data, as provided below:

POST /restore_target_response.php HTTP/1.1
Host: www.server.com
Content-Type: Application/XML
Content-Length: 667
<?XML version="1.0" encoding="UTF-8"?>
<restore_target_response>
<response_identifier>ID_response_11</response_identifier>
<target>iqn.2007-01.net.datto.dev.trainingnas:academyiscsi</target>
</restore_target_response>

If the client and the restore device are not the same device, the client may send a restore target message 433 to the backup device with the restore target. For example, if the user utilizes the client to control the restore device via a remote desktop tool, the user may send the restore target via the remote desktop tool.

The restore device may send a restore target connection request 437 to the backup device to establish a connection to the restore target. For example, the restore target connection request may include a device identifier (e.g., restore device UUID) of the restore device, login credentials, and/or the like authentication information. The backup device may send a restore target connection response 441 to the restore device to confirm that the connection to the restore target was authorized. The restore device may send a restore files copy request 445 to the backup device with a specification of restore files to copy to the restore device (e.g., directly (e.g., as specified by the user) or based on a command from the client (e.g., sent by the user via a remote desktop tool)). The backup device may copy the specified restore files 449 to the restore device.

FIG. 5 shows a logic flow illustrating embodiments of a restore processing (RP) component for the MPBR. In FIG. 5, a restore target request from a user utilizing a client device may be obtained at 501. For example, the restore target request may be obtained as a result of the user initiating a restore operation of backup files from a backup device to a restore device (e.g., the restore device may be the same as a source device associated with the backup files or a different device).

A recovery point associated with the restore operation may be determined at 505. In one implementation, the restore request may be parsed (e.g., using PHP commands) to determine information such as an identifier of a network share of the source device associated with the backup files (e.g., based on the value of the share_name field), an identifier of a recovery point associated with the backup files (e.g., based on the value of the snapshot_identifier field), a recovery type (e.g., based on the value of the retain_NTFS_permissions field), and/or the like.

A determination may be made at 509 whether the backup files of the network share stored on the backup device are sensitive data restricted to being restored to specified restore devices. In one implementation, pairing configuration settings associated with the source device may be retrieved (e.g., from a configuration file, from a database) to determine whether sensitive_flag field is set for the network share.

If the backup files are sensitive data, authorized restore device identifier(s) may be determined at 513. In one implementation, pairing configuration settings associated with the source device may be retrieved (e.g., from a configuration file, from a database) to determine the value of the authorized_devices field associated with the network share. A determination may be made at 517 whether the client device identifier of the user's client device matches one of the authorized restore device identifier(s). In one implementation, the client and the restore device may be the same device. As such, the restore device identifier may be compared against the authorized restore device identifier(s) to make this determination. In another implementation, the client and the restore device may be different devices. As such, the client device identifier may be compared against the authorized restore device identifier(s) to make this determination. If the client device identifier is not one of the authorized restore device identifier(s), the restore target request may be denied at 521. For example, a message may be sent to the user to inform the user that the client device is not authorized to perform a restore operation from the network share.

If the backup files are not sensitive data or if the client device is authorized, operating system configuration of the restore device may be determined at 525. In one implementation, the restore target request may be parsed (e.g., using PHP commands) to determine the operating system configuration (e.g., based on the values of the restore_OS and/or restore_OS_file_system fields). In another implementation, pairing configuration settings associated with the source device may be retrieved (e.g., from a configuration file, from a database) to determine the restore device operating system configuration.

A clone of the simulated block device backup volume for the network share at the recovery point may be generated at 529. In one implementation, a ZFS clone of the snapshot indicated by the restore point of the zvol for the network share may be made (e.g., using the ZFS clone command).

A network target for the clone may be generated at 533. In one embodiment, the network target may be configured such that the metadata (e.g., ACLs) stored by the backup device is presented to the restore device in a compatible format (e.g., NTFS) per the restore device operating system configuration. In one implementation, a new iSCSI target (e.g., iqn.2007-01.net.datto.dev.trainingnas:academyiscsi) may be created and pointed to the clone of the ZFS snapshot of the zvol (e.g., /dev/zvol/homePool/home/a1234b2e05f24d23ac4c1eed7f123ab4@1541653457).

The generated network target may be provided to the user at 537. For example, the network target may be provided via a restore target response sent to the user's client. In one implementation, the client and the restore device may be the same device. As such, providing the network target to the client also provides the network target to the restore device. In another implementation, the client and the restore device may be different devices. As such, the user may provide the network target to the restore device via a restore target message. For example, the user may send the restore target message via a remote desktop tool, via network-based commands, and/or the like.

A network target connection request may be obtained from the restore device at 541. For example, the network target connection request may be obtained as a result of the user connecting the restore device to the network target. In one implementation, an iSCSI Initiator may be utilized to mount the iSCSI network target on the restore device.

A determination may be made at 545 whether the backup files of the network share stored on the backup device are sensitive data restricted to being restored to specified restore devices. If the backup files are sensitive data, a determination may be made at 549 whether the restore device identifier of the restore device matches one of the authorized restore device identifier(s). In one implementation, the restore device identifier may be compared against the authorized restore device identifier(s) to make this determination. If the restore device identifier is not one of the authorized restore device identifier(s), the network target connection request may be denied at 553. For example, a message may be sent to the user to inform the user that the restore device is not authorized to perform a restore operation from the network share.

If the backup files are not sensitive data or if the restore device is authorized, connection to the network target may be authorized at 557. In one implementation, the restore device may be authorized without any further authentication. In another implementation, the restore device may have to provide login credentials (e.g., username and password) for the network target for the connection to be authorized.

A restore files copy request may be obtained from the restore device at 561. In one embodiment, the restore files copy request may specify which backup files to copy from the network target to the restore device. In one implementation, the client and the restore device may be the same device. As such, the user may specify which backup files to restore via a command directly at the restore device. In another implementation, the client and the restore device may be different devices. As such, the user may specify which backup files to restore via a command at the client device sent (e.g., via a remote desktop tool, via network-based commands) to the restore device. For example, the user may utilize the robocopy command to copy restore files from the iSCSI network target to the restore device having Windows operating system without losing metadata (e.g., ACLs) as follows:

This example copies the contents of the F: drive (e.g., network target) to the D: drive (e.g., restore device hard drive).
  robocopy F: D: /mir /Z /W:5 /fft /R:3 /secfix /copyall
This example copies from one subdirectory to another subdirectory.
  robocopy F: \Data D: \Data /mir /Z /W:5 /fft /R:3 /secfix /copyall
This example copies a specific file or files from one directory to another. Note: WildCards can be used.
  robocopy F: \Data D: \Data *.txt /Z /W:3 /fft /r:3 /v
The following list explains the meaning of each flag:
/MIR Mirrors a directory tree.
/Z Resumes transfer if interrupted during a large file copy.
/W:3 Waits three seconds before a retry.
/fft Assumes FAT file times, which has two-second precision, and is very close to real time.
/r:3 Allows for three re-tries before a file is dropped from the list.
/v Allows for verbose logging and output. This command is optional.

The backup device may provide the requested restore files to the restore device at 565.

FIG. 6 shows a screenshot illustrating user interface(s) of the MPBR. In FIG. 6, an exemplary user interface (e.g., for a website) for pairing a source device to a backup device is illustrated. Screen 601 shows that a user may utilize a "backup external share" widget 605 to begin configuring pairing settings.

FIG. 7 shows a screenshot illustrating user interface(s) of the MPBR. In FIG. 7, an exemplary user interface (e.g., for a website) for pairing a source device to a backup device is illustrated. Screen 701 shows that a user may utilize a "share name" widget 705 to specify a share name for a share to be paired, and an "SMB address" widget 710 to specify a share location for the share. The user may specify that metadata should be saved during backups via a "Retain NTFS file permissions" widget 715. The user may specify login credentials for the share via "credentials" widgets 720. The user may specify that sensitive data is stored on the share via a "sensitive" widget 725.

FIG. 8 shows a screenshot illustrating user interface(s) of the MPBR. In FIG. 8, an exemplary user interface (e.g., for a website) for pairing a source device to a backup device is illustrated. Screen 801 shows that a user may utilize "set the interval and schedule for local snapshots" widgets 805 to specify a backup schedule for the share for backups to the backup device. The user may utilize "set retention for local snapshots" widgets 810 to specify retention settings for snapshots (e.g., recovery points) stored on the backup device.

FIG. 9 shows a screenshot illustrating user interface(s) of the MPBR. In FIG. 9, an exemplary user interface (e.g., for a website) for pairing a source device to a backup device is illustrated. Screen 901 shows that a user may utilize "customize the interval and schedule for offsite snapshots" widgets 905 to specify a backup schedule for the share for replicating backups from the backup device to an offsite (e.g., cloud) location. The user may utilize "set retention for cloud snapshots" widgets 910 to specify retention settings for snapshots (e.g., recovery points) stored at the offsite (e.g., cloud) location.

FIG. 10 shows a screenshot illustrating user interface(s) of the MPBR. In FIG. 10, an exemplary user interface (e.g., for a website) for pairing a source device to a backup device is illustrated. Screen 1001 shows that a user may review specified pairing configuration settings, and may save the specified pairing configuration settings using a "finish" widget 1005.

FIG. 11 shows a screenshot illustrating user interface(s) of the MPBR. In FIG. 11, an exemplary user interface (e.g., for a website) for performing a manual backup is illustrated. Screen 1101 shows that a user may initiate a backup manually for the share using a "take a snapshot" widget 1105.

FIG. 12 shows a screenshot illustrating user interface(s) of the MPBR. In FIG. 12, an exemplary user interface (e.g., for a website) for restoring files from a backup device to a restore device is illustrated. Screen 1201 shows that a user may select the share for which to generate a network target using a "choose a system" widget 1205. The user may specify that files and associated metadata should be restored using a "choose a recovery type" widget 1210. The user may select a recovery point of the share for the restore operation using a "choose a recovery point" widget 1215. The user may initiate the generation of the network target using a "start restore" widget 1220.

ADDITIONAL ALTERNATIVE EMBODIMENT EXAMPLES

The following alternative example embodiments provide a number of variations of some of the core principles already discussed for expanded color on the abilities of the MPBR.

| General Term | Specific Example |
| --- | --- |
| backup computing device | Siris - Datto appliance |
| backup file system | NTFS-3G (Windows) - a freeware version of NTFS |
| backup operating system | Linux (Ubuntu) |
| source share | Protected share - a volume or partition that is protected on client device or server |
| source file system | NTFS |
| source operating system | Windows |
| backup volume | zvol |
| restoration file system | NTFS - The file system on the device that we restore to |
| restoration operating system | Windows - The operating system on the device that we restore to |
| metadata | ACL - Access Control List |
| network file sharing protocol | SMB (Server Message Block), Samba, AFP, NFS, FTP |
| driver | CIFS (Common Internet File System), option - cifsacl |
| target | iSCSI target (Internet Small Computer System Interface target) |

| Specific | General |
| --- | --- |
| "Preamble" | |
| Method for backing up and restoring files and file metadata using a Siris having a NTFS-3G file system and Linux operating system for files and metadata from a source share having a NTFS file system and Windows operating system, and restoring the files and file metadata to a restoration computing device having a Windows operating system, comprising | Method for backing up and restoring files and file metadata using a backup computing device having a backup device file system and backup device operating system for files and metadata from a source share having a source file system and source operating system, and restoring the files and file metadata to a restoration computing device having a restoration operating system, comprising, |
| Pairing Procedure | |
| 1. Provide credentials to a Siris having a Linux operating system to enable connection to a source share having a Windows operating system using a network file sharing protocol, and where the Linux operating system is different than the Windows operating system | 1. Provide credentials to a backup computing device having a backup device operating system to enable connection to a source share having a source operating system, using a network file sharing protocol, and where the backup device operating system is different than the source operating system |
| 2. Create a zvol on the Siris that will receive a copy of files and their respective metadata from the source share | 2. Create a backup volume on the backup computing device that will receive a copy of files and their respective metadata from the source share |
| 3. Format the zvol with the NTFS-3G file system, where the NTFS-3G file system allows the receiving and storing of target metadata | 3. Format the backup volume with the backup device file system, where the backup device file system allows the receiving and storing of target metadata |
| Backup Procedure | |
| 4. Connect to the source share from the Siris using the CIFS driver with -cifsacl option such that the metadata of the NTFS file system of the source share is presented to the SirisNTFS-3G file system | 4. Connect to the source share from the backup computing device using the network file sharing protocol and using a driver that enables file system access over a network such that the metadata of the source file system of the source share is presented to the backup computing device |
| 5. Transfer the files of the source share to the Siris, where the transferred files create a backup of the source share files on the NTFS-3G file system and where the metadata of the NTFS file system is transferred to the NTFS-3G file system and is recorded in the NTFS-3G file system | 5. Transfer the files of the source share to the backup computing device, where the transferred files create a backup of the source share files on the backup device file system and where the metadata of the source file system is transferred to the backup device file system and is recorded in the backup device file system |
| Restore Procedure | |
| 6. Expose the NTFS-3G file system of the zvol through a network to a restoration computing device | 6. Expose the backup device file system of the backup volume through a network to a restoration computing device |
| 7. Copy files and metadata of the exposed | 7. Copy files and metadata of the exposed |

| Specific | General |
|---|---|
| NTFS-3G file system to the restoration computing device to create a restoration of the files and metadata on the restoration computing device. | backup device file system to the restoration computing device to create a restoration of the files and metadata on the restoration computing device. |

| General | Variation |
|---|---|
| \multicolumn{2}{c}{"Preamble"} | |

Method for backing up and restoring files and file metadata using a backup computing device having a backup device file system and backup device operating system for files and
metadata from a source share having a source file system and source operating system, and
restoring the files and file metadata to a restoration computing device having a restoration operating system, comprising, Pairing Procedure

| General | Variation |
|---|---|
| 1. Provide credentials to a backup computing device having a backup device operating system to enable connection to a source share having a source operating system, using a network file sharing protocol, and where the backup device operating system is different than the source operating system | |
| 2. Create a backup volume on the backup computing device that will receive a copy of files and their respective metadata from the source share | 2. Create a snapshot capable volume on the backup computing device that will receive a copy of files and their respective metadata from the source share |
| 3. Format the backup volume with the backup device file system, where the backup device file system allows the receiving and storing of target metadata | 3. Format the snapshot capable volume with the backup device file system, where the backup device file system is not snap shot-capable and allows the receiving and storing of target metadata |

Backup Procedure

| General | Variation |
|---|---|
| 4. Connect to the source share from the backup computing device using the network file sharing protocol and using a driver that enables file system access over a network such that the metadata of the source file system of the source share is presented to the backup computing device | |
| 5. Transfer the files of the source share to the backup computing device, where the transferred files create a backup of the source share files on the backup device file system and where the metadata of the source file system is transferred to the backup device file system and is recorded in the backup device file system | 5. Transfer the files of the source share to the backup computing device, using an increment-capable transfer mechanism where the transferred files create a backup of the source share files on the backup device file system and where the metadata of the source file system is transferred to the backup device file system and is recorded in the backup device file system where the transfer includes iterating over each file in the source share and checking the Changed Time (or checksum or other similarity comparison) of each file against the start time of the last backup (transfer), if the Changed Time is newer, copy the target metadata of the given file to the matching file in the backup in the backup device file system |
| | 5.A. Create a snapshot of the snapshot capable volume |

Restore Procedure

| General | Variation |
|---|---|
| 6. Expose the backup device file system of the backup volume through a network to a restoration computing device | 6. Create a storage resource (iSCSI) and expose it to the snapshot (or a clone of the snapshot) |
| | 6.A. Connect the storage resource through a network to a restoration computing device having the source operating system running the source file system |
| 7. Copy files and metadata of the exposed backup device file system to the restoration computing device to create a restoration the files and metadata on the restoration computing device. | 7. Copy files and metadata of the storage resource to the restoration computing device of to create a restoration of the files and metadata on the restoration computing device. |

MPBR Controller

FIG. 13 shows a block diagram illustrating embodiments of a MPBR controller. In this embodiment, the MPBR controller 1301 may serve to aggregate, process, store, search, serve, identify, instruct, generate, match, and/or facilitate interactions with a computer through backup and restore systems technologies, and/or other related data.

Users, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MPBR controller 1301 may be connected to and/or communicate with entities such as, but not limited to: one or more users from peripheral devices 1312 (e.g., user input devices 1311); an optional cryptographic processor device 1328; and/or a communications network 1313.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The MPBR controller 1301 may be based on computer systems that may comprise, but are not limited to, components such as: a computer systemization 1302 connected to memory 1329.

Computer Systemization

A computer systemization 1302 may comprise a clock 1330, central processing unit ("CPU(s)" and/or "processor(s)" (these terms are used interchangeable throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effectuate communications, operations, storage, etc. The computer systemization may be connected to a power source 1386; e.g., optionally the power source may be internal. Optionally, a cryptographic processor 1326 may be connected to the system bus. In another embodiment, the cryptographic processor, transceivers (e.g., ICs) 1374, and/or sensor array (e.g., accelerometer, altimeter, ambient light, barometer, global positioning system (GPS) (thereby allowing MPBR controller to determine its location), gyroscope, magnetometer, pedometer, proximity, ultra-violet sensor, etc.) 1373 may be connected as either internal and/or external peripheral devices 1312 via the interface bus I/O 1308 (not pictured) and/or directly via the interface bus 1307. In turn, the transceivers may be connected to antenna(s) 1375, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11 g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's Dragon-Ball® and PowerPC®; IBM's® and Sony's® Cell processor; Intel's® 80X86 series (e.g., 80386, 80486), Pentium®, Celeron®, Core (2) Duo®, i series (e.g., i3, i5, i7, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to various data processing techniques. Such instruction passing facilitates communication within the MPBR controller and beyond through various interfaces. Should processing requirements dictate a greater amount speed and/or capacity, distributed processors (e.g., see Distributed MPBR below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MPBR may be achieved by implementing a microcontroller such as CAST's® R8051XC2 microcontroller; Intel's® MCS 51 (i.e., 8051 microcontroller); and/or the like. Also, to implement certain features of the MPBR, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MPBR component collection (distributed or otherwise) and/or features may be implemented via the microprocessor and/or via embedded components; e.g., via ASIC, coprocessor, DSP, FPGA, and/or the like. Alternately, some implementations of the MPBR may be implemented with embedded components that are configured and used to achieve a variety of features or signal processing.

Depending on the particular implementation, the embedded components may include software solutions, hardware solutions, and/or some combination of both hardware/software solutions. For example, MPBR features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the MPBR features. A hierarchy of programmable interconnects allow logic blocks to be interconnected as needed by the MPBR system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MPBR may be developed on FPGAs and then migrated into a fixed version that more resembles ASIC implementations. Alternate or coordinating implementations may migrate MPBR controller features to a final ASIC instead of or in addition to FPGAs. Depending on the implementation all of the aforementioned embedded components and microprocessors may be considered the "CPU" and/or "processor" for the MPBR.

Power Source

The power source 1386 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the MPBR thereby providing an electric current to all subsequent components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(ses) 1307 may accept, connect, and/or communicate to a number of interface adapters, variously although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1310 may accept, communicate, and/or connect to a communications network 1313. Through a communications network 1313, the MPBR controller is accessible through remote clients 1333*b* (e.g., computers with web browsers) by users 1333*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MPBR below), architectures may similarly be employed to pool, load balance, and/or otherwise decrease/increase the communicative bandwidth required by the MPBR controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user, peripheral devices 1312 (e.g., input devices 1311), cryptographic processor devices 1328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 1312 may be connected and/or communicate to I/O and/or other facilities of the like such as network interfaces, storage interfaces, directly to the interface bus, system bus, the CPU, and/or the like. Peripheral devices may be external, internal and/or part of the MPBR controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1311 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MPBR controller may be embodied as an embedded, dedicated, and/or monitor-less (i.e., headless) device, wherein access would be provided over a network interface connection.

Cryptographic units such as, but not limited to, microcontrollers, processors 1326, interfaces 1327, and/or devices 1328 may be attached, and/or communicate with the MPBR controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the MPBR controller and/or a computer systemization may employ various forms of memory 1329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 1329 will include ROM 1306, RAM 1305, and a storage device 1314. A storage device 1314 may be any various computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the MPBR component(s) 1335; and/or the like (i.e., collectively a component collection). These components may be stored and accessed from the storage devices and/or from storage devices accessible through an interface bus. Although unconventional program components such as those in the component collection may be stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the MPBR controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MPBR controller to communicate with other entities through a communications network 1313. Various communication protocols may be used by the MPBR controller as a subcarrier transport mechanism for interaction, such as, but not limited to: multicast, TCP/IP, UDP, unicast, and/or the like.

Information Server

An information server component 1316 is a stored program component that is executed by a CPU. The information server may be a an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or . NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects®, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), open XML-based Extensible Messaging and Presence Protocol (XMPP)

(i.e., Jabber® or Open Mobile Alliance's (OMA's) Instant Messaging and Presence Service (IMPS)), Yahoo! Instant Messenger® Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MPBR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MPBR database 1319, operating systems, other program components, user interfaces, Web browsers, and/or the like.

Access to the MPBR database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MPBR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, wherein the resulting command is provided over the bridge mechanism to the MPBR as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, menus, scrollers, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other web-browser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface®, any of which may be used and) provide a baseline and means of accessing and displaying information graphically to users.

A user interface component 1317 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MPBR enabled nodes. The combined application may be nugatory on systems employing Web browsers.

Mail Server

A mail server component 1321 is a stored program component that is executed by a CPU 1303. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MPBR. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the MPBR mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MPBR may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to allow the MPBR component to engage in secure transactions if so desired. The cryptographic component facilitates the secure accessing of resources on the MPBR and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MPBR Database

The MPBR database component 1319 may be embodied in a database and its stored data. The database is a stored program component, which is executed by the CPU; the stored program component portion configuring the CPU to process the stored data. The database may be a fault tolerant, relational, scalable, secure database such as MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MPBR database may be implemented using various other data-structures, such as an array, hash, (linked) list, struct, structured text file (e.g., XML), table, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MPBR database is implemented as a data-structure, the use of the MPBR database 1319 may be integrated into another component such as the MPBR component 1335. Also, the database may be implemented as a mix of data structures, objects, and relational structures. Databases may be consolidated and/or distributed in countless variations (e.g., see Distributed MPBR below). Portions of databases, e.g., tables, may be exported and/or imported and thus decentralized and/or integrated.

In one embodiment, the database component 1319 includes several tables 1319*a-i:*

An accounts table 1319*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAcces sPrivileges, accountPreferences, accountRestrictions, and/or the like;

A users table 1319*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MPBR);

An devices table 1319*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1319*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1319*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1319*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestricTions, and/or the like;

An transactions table 1319*g* includes fields such as, but not limited to: transactionID, accountID, assetID s, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1319*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAcces sPrivileges, merchantPreferences, merchantRestrictions, and/or the like;

An ads table 1319*i* includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescripTion, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like.

In one embodiment, the MPBR database may interact with other database systems. For example, employing a distributed database system, queries and data access by search MPBR component may treat the combination of the MPBR database, an integrated data security layer database as a single database entity (e.g., see Distributed MPBR below).

In one embodiment, user programs may contain various user interface primitives, which may serve to update the MPBR. Also, various accounts may require custom database tables depending upon the environments and the types of clients the MPBR may need to serve. It should be noted that any unique fields may be designated as a key field throughout. In an alternative embodiment, these tables have been decentralized into their own databases and their respective database controllers (i.e., individual database controllers for each of the above tables). Employing various data processing techniques, one may further distribute the databases over several computer systemizations and/or storage devices. Similarly, configurations of the decentralized database controllers may be varied by consolidating and/or distributing the various database components 1319a-i. The MPBR may be configured to keep track of various settings, inputs, and parameters via database controllers.

The MPBR database may communicate to and/or with other components in a component collection, including itself, and/or facilities of the like. Most frequently, the MPBR database communicates with the MPBR component, other program components, and/or the like. The database may contain, retain, and provide information regarding other nodes and data.

The MPBRs

The MPBR component 1335 is a stored program component that is executed by a CPU. In one embodiment, the MPBR component incorporates any and/or all combinations of the aspects of the MPBR that was discussed in the previous figures. As such, the MPBR affects accessing, obtaining and the provision of information, services, transactions, and/or the like across various communications networks. The features and embodiments of the MPBR discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MPBR's features and facilities, and in many cases reduce the costs, energy consumption/requirements, and extend the life of MPBR's underlying infrastructure; this has the added benefit of making the MPBR more reliable. Similarly, many of the features and mechanisms are designed to be easier for users to use and access, thereby broadening the audience that may enjoy/employ and exploit the feature sets of the MPBR; such ease of use also helps to increase the reliability of the MPBR. In addition, the feature sets include heightened security as noted via the Cryptographic components 1320, 1326, 1328 and throughout, making access to the features and data more reliable and secure The MPBR transforms pairing request, backup request, restore request inputs, via MPBR components (e.g., DP, BP, RP), into pairing response, backup response, restore response outputs.

The MPBR component enabling access of information between nodes may be developed by employing various development tools and languages such as, but not limited to: Apache® components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the MPBR server employs a cryptographic server to encrypt and decrypt communications. The MPBR component may communicate to and/or with other components in a component collection, including itself, and/or facilities of the like. Most frequently, the MPBR component communicates with the MPBR database, operating systems, other program components, and/or the like. The MPBR may contain, communicate, generate, obtain, and/or provide program component, system, user, and/or data communications, requests, and/or responses.

Distributed MPBRs

The structure and/or operation of any of the MPBR node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through various data processing communication techniques.

The configuration of the MPBR controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for MPBR controller and/or MPBR component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data.

Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MPBR controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
$input=" ";
$input=socket_read($client, 1024);
$data .=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/
    index.jsp?topic=/com.ibm.IBMDI.doc/
    referenceguide295.htm and other parser implementations:

http://publib.boulder.ibm.com/infocenter/tivihelp/v2r1/
    index.jsp?topic=/com.ibm.IBMDI.doc/
    referenceguide259.htm all of which are hereby expressly incorporated by reference.

Additional embodiments may include:
1. A metadata-preserving backup apparatus, comprising:
a memory;
a component collection in the memory, including:
  a device pairing component, and
  a backup processing component;
a processor disposed in communication with the memory, and configured to issue a plurality of processing instructions from the component collection stored in the memory,
  wherein the processor issues instructions from the device pairing component, stored in the memory, to:
    obtain, via at least one processor, a device pairing request associated with a source share at a source device;
    determine, via at least one processor, an operating system configuration associated with the source share;
    create, via at least one processor, a simulated block device backup volume for the source share on a backup device, wherein the source device and the backup device utilize heterogeneous operating systems; and
    format, via at least one processor, the simulated block device backup volume with the source device's file system using a file system driver executable by the backup device's operating system;
  wherein the processor issues instructions from the backup processing component, stored in the memory, to:
    obtain, via at least one processor, a backup request associated with the source share;
    configure, via at least one processor, a file sharing protocol driver such that metadata associated with files stored on the source share is presented to the backup device in a compatible metadata format with regard to the backup device's operating system;
    establish, via at least one processor, a connection between the backup device and the source device using the configured file sharing protocol driver;
    synchronize, via the connection, files from the source share to the simulated block device backup volume;
    determine, via at least one processor, changed synchronized files that have been changed since a preceding backup request associated with the source share was processed;
    update, via at least one processor, metadata associated with the changed synchronized files on the simulated block device backup volume with metadata associated with the changed synchronized files on the source share; and
    generate, via at least one processor, a snapshot of the simulated block device backup volume.
2. The apparatus of embodiment 1, wherein the operating system configuration comprises a specification of an operating system associated with the source device.
3. The apparatus of embodiment 1, wherein the operating system configuration comprises a specification of a file system associated with the source share.
4. The apparatus of embodiment 1, wherein the simulated block device backup volume is a ZFS zvol.
5. The apparatus of embodiment 1, wherein the source device's operating system is Microsoft Windows, wherein the backup device's operating system is Linux, wherein the source device's file system is NTFS, and wherein the file system driver is NTFS-3G.
6. The apparatus of embodiment 1, wherein the backup request is obtained as a result of a manual backup initiated by a user.
7. The apparatus of embodiment 1, wherein the backup request is obtained as a result of a scheduled backup.
8. The apparatus of embodiment 1, wherein the file sharing protocol driver is one of: CIFS, SMB, Samba, and wherein the compatible metadata format is Linux extended file attributes format.
9. The apparatus of embodiment 1, wherein the instructions to synchronize files further comprise instructions to execute an incremental copy operation that copies files that have been changed.
10. The apparatus of embodiment 1, wherein the instructions to synchronize files further comprise instructions to copy the entire contents of the source share.
11. The apparatus of embodiment 1, wherein the instructions to determine changed synchronized files further comprise instructions to determine each file's changed time.
12. The apparatus of embodiment 1, wherein the instructions to determine changed synchronized files further comprise instructions to determine each file's checksum.
13. The apparatus of embodiment 1, wherein the instructions to update metadata further comprise instructions to copy each changed file's metadata provided by the file sharing protocol driver to metadata of the respective changed file on the simulated block device backup volume using the file system driver.
14. The apparatus of embodiment 1, wherein the instructions to update metadata further comprise instructions to:
  decode each changed file's metadata provided by the file sharing protocol driver to determine metadata values; and
  set corresponding metadata values of the respective changed file on the simulated block device backup volume.
15. The apparatus of embodiment 1, further, comprising:
  a restore processing component in the component collection; and
  the processor issues instructions from the restore processing component, stored in the memory, to:
    obtain, via at least one processor, a restore target request associated with the source share;
    determine, via at least one processor, a recovery point associated with the restore target request, wherein the recovery point is associated with a snapshot of the simulated block device backup volume;
    generate, via at least one processor, a clone of the simulated block device backup volume at the recovery point;
    generate, via at least one processor, a network target for the clone; and
    provide, via at least one processor, the generated network target to a user associated with the restore target request.
16. The apparatus of embodiment 15, wherein the network target is an iSCSI target.
17. The apparatus of embodiment 15, further, comprising:
  the processor issues instructions from the device pairing component, stored in the memory, to:
    determine, via at least one processor, a set of authorized restore device identifiers associated with the source share;
  the processor issues instructions from the restore processing component, stored in the memory, to:

determine, via at least one processor, a restore device identifier of a restore device associated with the restore target request; and deny, via at least one processor, the restore target request upon determining that the restore device identifier is not in the set of authorized restore device identifiers.

18. The apparatus of embodiment 17, wherein a restore device identifier is one of: a UUID, a MAC address.

19. A processor-readable metadata-preserving backup non-transient physical medium storing processor-executable components, the components, comprising:
a component collection stored in the medium, including:
a device pairing component, and
a backup processing component;
wherein the device pairing component, stored in the medium, includes processor-issuable instructions to:
obtain, via at least one processor, a device pairing request associated with a source share at a source device;
determine, via at least one processor, an operating system configuration associated with the source share;
create, via at least one processor, a simulated block device backup volume for the source share on a backup device, wherein the source device and the backup device utilize heterogeneous operating systems; and
format, via at least one processor, the simulated block device backup volume with the source device's file system using a file system driver executable by the backup device's operating system;
wherein the backup processing component, stored in the medium, includes processor-issuable instructions to:
obtain, via at least one processor, a backup request associated with the source share;
configure, via at least one processor, a file sharing protocol driver such that metadata associated with files stored on the source share is presented to the backup device in a compatible metadata format with regard to the backup device's operating system;
establish, via at least one processor, a connection between the backup device and the source device using the configured file sharing protocol driver;
synchronize, via the connection, files from the source share to the simulated block device backup volume;
determine, via at least one processor, changed synchronized files that have been changed since a preceding backup request associated with the source share was processed;
update, via at least one processor, metadata associated with the changed synchronized files on the simulated block device backup volume with metadata associated with the changed synchronized files on the source share; and generate, via at least one processor, a snapshot of the simulated block device backup volume.

20. The medium of embodiment 19, wherein the operating system configuration comprises a specification of an operating system associated with the source device.

21. The medium of embodiment 19, wherein the operating system configuration comprises a specification of a file system associated with the source share.

22. The medium of embodiment 19, wherein the simulated block device backup volume is a ZFS zvol.

23. The medium of embodiment 19, wherein the source device's operating system is Microsoft Windows, wherein the backup device's operating system is Linux, wherein the source device's file system is NTFS, and wherein the file system driver is NTFS-3G.

24. The medium of embodiment 19, wherein the backup request is obtained as a result of a manual backup initiated by a user.

25. The medium of embodiment 19, wherein the backup request is obtained as a result of a scheduled backup.

26. The medium of embodiment 19, wherein the file sharing protocol driver is one of: CIFS, SMB, Samba, and wherein the compatible metadata format is Linux extended file attributes format.

27. The medium of embodiment 19, wherein the instructions to synchronize files further comprise instructions to execute an incremental copy operation that copies files that have been changed.

28. The medium of embodiment 19, wherein the instructions to synchronize files further comprise instructions to copy the entire contents of the source share.

29. The medium of embodiment 19, wherein the instructions to determine changed synchronized files further comprise instructions to determine each file's changed time.

30. The medium of embodiment 19, wherein the instructions to determine changed synchronized files further comprise instructions to determine each file's checksum.

31. The medium of embodiment 19, wherein the instructions to update metadata further comprise instructions to copy each changed file's metadata provided by the file sharing protocol driver to metadata of the respective changed file on the simulated block device backup volume using the file system driver.

32. The medium of embodiment 19, wherein the instructions to update metadata further comprise instructions to:
decode each changed file's metadata provided by the file sharing protocol driver to determine metadata values; and
set corresponding metadata values of the respective changed file on the simulated block device backup volume.

33. The medium of embodiment 19, further, comprising:
a restore processing component in the component collection; and
the restore processing component, stored in the medium, includes processor-issuable instructions to:
obtain, via at least one processor, a restore target request associated with the source share;
determine, via at least one processor, a recovery point associated with the restore target request, wherein the recovery point is associated with a snapshot of the simulated block device backup volume;
generate, via at least one processor, a clone of the simulated block device backup volume at the recovery point;
generate, via at least one processor, a network target for the clone; and
provide, via at least one processor, the generated network target to a user associated with the restore target request.

34. The medium of embodiment 33, wherein the network target is an iSCSI target.

35. The medium of embodiment 33, further, comprising:
the device pairing component, stored in the medium, includes processor-issuable instructions to:
determine, via at least one processor, a set of authorized restore device identifiers associated with the source share;

the restore processing component, stored in the medium, includes processor-issuable instructions to:
  determine, via at least one processor, a restore device identifier of a restore device associated with the restore target request; and
  deny, via at least one processor, the restore target request upon determining that the restore device identifier is not in the set of authorized restore device identifiers.
36. The medium of embodiment 35, wherein a restore device identifier is one of: a UUID, a MAC address.
37. A processor-implemented metadata-preserving backup system, comprising:
  a device pairing component means, to:
    obtain, via at least one processor, a device pairing request associated with a source share at a source device;
    determine, via at least one processor, an operating system configuration associated with the source share;
    create, via at least one processor, a simulated block device backup volume for the source share on a backup device, wherein the source device and the backup device utilize heterogeneous operating systems; and
    format, via at least one processor, the simulated block device backup volume with the source device's file system using a file system driver executable by the backup device's operating system;
  a backup processing component means, to:
    obtain, via at least one processor, a backup request associated with the source share;
    configure, via at least one processor, a file sharing protocol driver such that metadata associated with files stored on the source share is presented to the backup device in a compatible metadata format with regard to the backup device's operating system;
    establish, via at least one processor, a connection between the backup device and the source device using the configured file sharing protocol driver;
    synchronize, via the connection, files from the source share to the simulated block device backup volume;
    determine, via at least one processor, changed synchronized files that have been changed since a preceding backup request associated with the source share was processed;
    update, via at least one processor, metadata associated with the changed synchronized files on the simulated block device backup volume with metadata associated with the changed synchronized files on the source share; and
    generate, via at least one processor, a snapshot of the simulated block device backup volume.
38. The system of embodiment 37, wherein the operating system configuration comprises a specification of an operating system associated with the source device.
39. The system of embodiment 37, wherein the operating system configuration comprises a specification of a file system associated with the source share.
40. The system of embodiment 37, wherein the simulated block device backup volume is a ZFS zvol.
41. The system of embodiment 37, wherein the source device's operating system is Microsoft Windows, wherein the backup device's operating system is Linux, wherein the source device's file system is NTFS, and wherein the file system driver is NTFS-3G.
42. The system of embodiment 37, wherein the backup request is obtained as a result of a manual backup initiated by a user.
43. The system of embodiment 37, wherein the backup request is obtained as a result of a scheduled backup.
44. The system of embodiment 37, wherein the file sharing protocol driver is one of: CIFS, SMB, Samba, and wherein the compatible metadata format is Linux extended file attributes format.
45. The system of embodiment 37, wherein the means to synchronize files further comprise means to execute an incremental copy operation that copies files that have been changed.
46. The system of embodiment 37, wherein the means to synchronize files further comprise means to copy the entire contents of the source share.
47. The system of embodiment 37, wherein the means to determine changed synchronized files further comprise means to determine each file's changed time.
48. The system of embodiment 37, wherein the means to determine changed synchronized files further comprise means to determine each file's checksum.
49. The system of embodiment 37, wherein the means to update metadata further comprise means to copy each changed file's metadata provided by the file sharing protocol driver to metadata of the respective changed file on the simulated block device backup volume using the file system driver.
50. The system of embodiment 37, wherein the means to update metadata further comprise means to:
  decode each changed file's metadata provided by the file sharing protocol driver to determine metadata values; and
  set corresponding metadata values of the respective changed file on the simulated block device backup volume.
51. The system of embodiment 37, further, comprising:
  a restore processing component means, to:
    obtain, via at least one processor, a restore target request associated with the source share;
    determine, via at least one processor, a recovery point associated with the restore target request, wherein the recovery point is associated with a snapshot of the simulated block device backup volume;
    generate, via at least one processor, a clone of the simulated block device backup volume at the recovery point;
    generate, via at least one processor, a network target for the clone; and
    provide, via at least one processor, the generated network target to a user associated with the restore target request.
52. The system of embodiment 51, wherein the network target is an iSCSI target.
53. The system of embodiment 51, further, comprising:
  the device pairing component means, to:
    determine, via at least one processor, a set of authorized restore device identifiers associated with the source share;
  the restore processing component means, to:
    determine, via at least one processor, a restore device identifier of a restore device associated with the restore target request; and
    deny, via at least one processor, the restore target request upon determining that the restore device identifier is not in the set of authorized restore device identifiers.

54. The system of embodiment 53, wherein a restore device identifier is one of: a UUID, a MAC address.

55. A processor-implemented metadata-preserving backup method, comprising:
executing processor-implemented device pairing component instructions to:
obtain, via at least one processor, a device pairing request associated with a source share at a source device;
determine, via at least one processor, an operating system configuration associated with the source share;
create, via at least one processor, a simulated block device backup volume for the source share on a backup device, wherein the source device and the backup device utilize heterogeneous operating systems; and
format, via at least one processor, the simulated block device backup volume with the source device's file system using a file system driver executable by the backup device's operating system;
executing processor-implemented backup processing component instructions to:
obtain, via at least one processor, a backup request associated with the source share;
configure, via at least one processor, a file sharing protocol driver such that metadata associated with files stored on the source share is presented to the backup device in a compatible metadata format with regard to the backup device's operating system;
establish, via at least one processor, a connection between the backup device and the source device using the configured file sharing protocol driver;
synchronize, via the connection, files from the source share to the simulated block device backup volume;
determine, via at least one processor, changed synchronized files that have been changed since a preceding backup request associated with the source share was processed;
update, via at least one processor, metadata associated with the changed synchronized files on the simulated block device backup volume with metadata associated with the changed synchronized files on the source share; and
generate, via at least one processor, a snapshot of the simulated block device backup volume.

56. The method of embodiment 55, wherein the operating system configuration comprises a specification of an operating system associated with the source device.

57. The method of embodiment 55, wherein the operating system configuration comprises a specification of a file system associated with the source share.

58. The method of embodiment 55, wherein the simulated block device backup volume is a ZFS zvol.

59. The method of embodiment 55, wherein the source device's operating system is Microsoft Windows, wherein the backup device's operating system is Linux, wherein the source device's file system is NTFS, and wherein the file system driver is NTFS-3G.

60. The method of embodiment 55, wherein the backup request is obtained as a result of a manual backup initiated by a user.

61. The method of embodiment 55, wherein the backup request is obtained as a result of a scheduled backup.

62. The method of embodiment 55, wherein the file sharing protocol driver is one of: CIFS, SMB, Samba, and wherein the compatible metadata format is Linux extended file attributes format.

63. The method of embodiment 55, wherein the instructions to synchronize files further comprise instructions to execute an incremental copy operation that copies files that have been changed.

64. The method of embodiment 55, wherein the instructions to synchronize files further comprise instructions to copy the entire contents of the source share.

65. The method of embodiment 55, wherein the instructions to determine changed synchronized files further comprise instructions to determine each file's changed time.

66. The method of embodiment 55, wherein the instructions to determine changed synchronized files further comprise instructions to determine each file's checksum.

67. The method of embodiment 55, wherein the instructions to update metadata further comprise instructions to copy each changed file's metadata provided by the file sharing protocol driver to metadata of the respective changed file on the simulated block device backup volume using the file system driver.

68. The method of embodiment 55, wherein the instructions to update metadata further comprise instructions to:
decode each changed file's metadata provided by the file sharing protocol driver to determine metadata values; and
set corresponding metadata values of the respective changed file on the simulated block device backup volume.

69. The method of embodiment 55, further, comprising:
executing processor-implemented restore processing component instructions to:
obtain, via at least one processor, a restore target request associated with the source share;
determine, via at least one processor, a recovery point associated with the restore target request, wherein the recovery point is associated with a snapshot of the simulated block device backup volume;
generate, via at least one processor, a clone of the simulated block device backup volume at the recovery point;
generate, via at least one processor, a network target for the clone; and
provide, via at least one processor, the generated network target to a user associated with the restore target request.

70. The method of embodiment 69, wherein the network target is an iSCSI target.

71. The method of embodiment 69, further, comprising:
executing processor-implemented device pairing component instructions to:
determine, via at least one processor, a set of authorized restore device identifiers associated with the source share;
executing processor-implemented restore processing component instructions to:
determine, via at least one processor, a restore device identifier of a restore device associated with the restore target request; and
deny, via at least one processor, the restore target request upon determining that the restore device identifier is not in the set of authorized restore device identifiers.

72. The method of embodiment 71, wherein a restore device identifier is one of: a UUID, a MAC address.

In order to address various issues and advance the art, the entirety of this application for Object-Level Metadata-Preserving Cross Heterogeneous Operating Systems Backup And Restore Apparatuses, Methods And Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivative thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MPBR individual and/or enterprise user, database configuration and/or relational model, data type, data transmission and/or network framework, syntax structure, and/or the like, various embodiments of the MPBR, may be implemented that allow a great deal of flexibility and customization. For example, aspects of the MPBR may be adapted for storage management systems. While various embodiments and discussions of the MPBR have included backup and restore systems, however, it is to be understood that the embodiments described herein may be readily configured and/or customized for a wide variety of other applications and/or implementations.

What is claimed is:

1. A metadata-preserving backup apparatus, comprising:
   a memory;
   a component collection in the memory, including:
      a device pairing component, and
      a backup processing component;
   a processor disposed in communication with the memory, and configured to issue a plurality of processing instructions from the component collection stored in the memory,
      wherein the processor issues instructions from the device pairing component, stored in the memory, to:
         obtain, via at least one processor, a device pairing request associated with a source share at a source device;
         determine, via at least one processor, an operating system configuration associated with the source share;
         create, via at least one processor, a simulated block device backup volume for the source share on a backup device, wherein the source device and the backup device utilize heterogeneous operating systems; and
         format, via at least one processor, the simulated block device backup volume with the source device's file system using a file system driver executable by the backup device's operating system;
      wherein the processor issues instructions from the backup processing component, stored in the memory, to:
         obtain, via at least one processor, a backup request associated with the source share;
         configure, via at least one processor, a file sharing protocol driver such that metadata associated with files stored on the source share is presented to the backup device in a compatible metadata format with regard to the backup device's operating system;

establish, via at least one processor, a connection between the backup device and the source device using the configured file sharing protocol driver;

synchronize, via the connection, files from the source share to the simulated block device backup volume;

determine, via at least one processor, changed synchronized files that have been changed since a preceding backup request associated with the source share was processed;

update, via at least one processor, metadata associated with the changed synchronized files on the simulated block device backup volume with metadata associated with the changed synchronized files on the source share; and generate, via at least one processor, a snapshot of the simulated block device backup volume.

2. The apparatus of claim 1, wherein the operating system configuration comprises a specification of an operating system associated with the source device.

3. The apparatus of claim 1, wherein the operating system configuration comprises a specification of a file system associated with the source share.

4. The apparatus of claim 1, wherein the simulated block device backup volume is a ZFS zvol.

5. The apparatus of claim 1, wherein the source device's operating system is Microsoft Windows, wherein the backup device's operating system is Linux, wherein the source device's file system is NTFS, and wherein the file system driver is NTFS-3G.

6. The apparatus of claim 1, wherein the backup request is obtained as a result of a manual backup initiated by a user.

7. The apparatus of claim 1, wherein the backup request is obtained as a result of a scheduled backup.

8. The apparatus of claim 1, wherein the file sharing protocol driver is one of: CIFS, SMB, Samba, and wherein the compatible metadata format is Linux extended file attributes format.

9. The apparatus of claim 1, wherein the instructions to synchronize files further comprise instructions to execute an incremental copy operation that copies files that have been changed.

10. The apparatus of claim 1, wherein the instructions to synchronize files further comprise instructions to copy the entire contents of the source share.

11. The apparatus of claim 1, wherein the instructions to determine changed synchronized files further comprise instructions to determine each file's changed time.

12. The apparatus of claim 1, wherein the instructions to determine changed synchronized files further comprise instructions to determine each file's checksum.

13. The apparatus of claim 1, wherein the instructions to update metadata further comprise instructions to copy each changed file's metadata provided by the file sharing protocol driver to metadata of the respective changed file on the simulated block device backup volume using the file system driver.

14. The apparatus of claim 1, wherein the instructions to update metadata further comprise instructions to:

decode each changed file's metadata provided by the file sharing protocol driver to determine metadata values; and set corresponding metadata values of the respective changed file on the simulated block device backup volume.

15. The apparatus of claim 1, further, comprising:

a restore processing component in the component collection; and the processor issues instructions from the restore processing component, stored in the memory, to:

obtain, via at least one processor, a restore target request associated with the source share;

determine, via at least one processor, a recovery point associated with the restore target request, wherein the recovery point is associated with a snapshot of the simulated block device backup volume;

generate, via at least one processor, a clone of the simulated block device backup volume at the recovery point;

generate, via at least one processor, a network target for the clone; and provide, via at least one processor, the generated network target to a user associated with the restore target request.

16. The apparatus of claim 15, wherein the network target is an iSCSI target.

17. The apparatus of claim 15, further, comprising:

the processor issues instructions from the device pairing component, stored in the memory, to:

determine, via at least one processor, a set of authorized restore device identifiers associated with the source share;

the processor issues instructions from the restore processing component, stored in the memory, to:

determine, via at least one processor, a restore device identifier of a restore device associated with the restore target request; and deny, via at least one processor, the restore target request upon determining that the restore device identifier is not in the set of authorized restore device identifiers.

18. The apparatus of claim 17, wherein a restore device identifier is one of: a UUID, a MAC address.

19. A processor-readable metadata-preserving backup non-transient physical medium storing processor-executable components, the components, comprising:

a component collection stored in the medium, including:

a device pairing component, and a backup processing component;

wherein the device pairing component, stored in the medium, includes processor-issuable instructions to:

obtain, via at least one processor, a device pairing request associated with a source share at a source device;

determine, via at least one processor, an operating system configuration associated with the source share;

create, via at least one processor, a simulated block device backup volume for the source share on a backup device, wherein the source device and the backup device utilize heterogeneous operating systems; and format, via at least one processor, the simulated block device backup volume with the source device's file system using a file system driver executable by the backup device's operating system;

wherein the backup processing component, stored in the medium, includes processor-issuable instructions to:

obtain, via at least one processor, a backup request associated with the source share;

configure, via at least one processor, a file sharing protocol driver such that metadata associated with files stored on the source share is presented to the backup device in a compatible metadata format with regard to the backup device's operating system;

establish, via at least one processor, a connection between the backup device and the source device using the configured file sharing protocol driver;

synchronize, via the connection, files from the source share to the simulated block device backup volume;

determine, via at least one processor, changed synchronized files that have been changed since a preceding backup request associated with the source share was processed;

update, via at least one processor, metadata associated with the changed synchronized files on the simulated block device backup volume with metadata associated with the changed synchronized files on the source share; and generate, via at least one processor, a snapshot of the simulated block device backup volume.

20. A processor-implemented metadata-preserving backup system, comprising:

a device pairing component means, to:
  obtain, via at least one processor, a device pairing request associated with a source share at a source device;
  determine, via at least one processor, an operating system configuration associated with the source share;
  create, via at least one processor, a simulated block device backup volume for the source share on a backup device, wherein the source device and the backup device utilize heterogeneous operating systems; and
  format, via at least one processor, the simulated block device backup volume with the source device's file system using a file system driver executable by the backup device's operating system;

a backup processing component means, to:
  obtain, via at least one processor, a backup request associated with the source share;
  configure, via at least one processor, a file sharing protocol driver such that metadata associated with files stored on the source share is presented to the backup device in a compatible metadata format with regard to the backup device's operating system;
  establish, via at least one processor, a connection between the backup device and the source device using the configured file sharing protocol driver;
  synchronize, via the connection, files from the source share to the simulated block device backup volume;
  determine, via at least one processor, changed synchronized files that have been changed since a preceding backup request associated with the source share was processed;
  update, via at least one processor, metadata associated with the changed synchronized files on the simulated block device backup volume with metadata associated with the changed synchronized files on the source share; and
  generate, via at least one processor, a snapshot of the simulated block device backup volume.

21. A processor-implemented metadata-preserving backup method, comprising:

executing processor-implemented device pairing component instructions to:
  obtain, via at least one processor, a device pairing request associated with a source share at a source device;
  determine, via at least one processor, an operating system configuration associated with the source share;
  create, via at least one processor, a simulated block device backup volume for the source share on a backup device, wherein the source device and the backup device utilize heterogeneous operating systems; and
  format, via at least one processor, the simulated block device backup volume with the source device's file system using a file system driver executable by the backup device's operating system;

executing processor-implemented backup processing component instructions to:
  obtain, via at least one processor, a backup request associated with the source share;
  configure, via at least one processor, a file sharing protocol driver such that metadata associated with files stored on the source share is presented to the backup device in a compatible metadata format with regard to the backup device's operating system;
  establish, via at least one processor, a connection between the backup device and the source device using the configured file sharing protocol driver;
  synchronize, via the connection, files from the source share to the simulated block device backup volume;
  determine, via at least one processor, changed synchronized files that have been changed since a preceding backup request associated with the source share was processed;
  update, via at least one processor, metadata associated with the changed synchronized files on the simulated block device backup volume with metadata associated with the changed synchronized files on the source share; and
  generate, via at least one processor, a snapshot of the simulated block device backup volume.

* * * * *